United States Patent
Takama et al.

(10) Patent No.: US 11,400,512 B2
(45) Date of Patent: Aug. 2, 2022

(54) COATED SAND, PRODUCTION METHOD FOR SAME, AND PRODUCTION METHOD FOR CASTING MOLD

(71) Applicant: ASAHI YUKIZAI CORPORATION, Nobeoka (JP)

(72) Inventors: Tomohiro Takama, Niwa-Gun (JP); Tetsuya Ura, Niwa-Gun (JP)

(73) Assignee: Asahi Yukizai Corporation, Nobeoka (JP)

( * ) Notice: Subject to any disclaimer, the term of this patent is extended or adjusted under 35 U.S.C. 154(b) by 252 days.

(21) Appl. No.: 16/893,710

(22) Filed: Jun. 5, 2020

(65) Prior Publication Data
US 2020/0306822 A1   Oct. 1, 2020

Related U.S. Application Data

(63) Continuation of application No. PCT/JP2018/048488, filed on Dec. 28, 2018.

(30) Foreign Application Priority Data

Dec. 28, 2017   (JP) .............................. JP2017-253877

(51) Int. Cl.
*B22C 1/18*   (2006.01)
*B22C 1/02*   (2006.01)
(Continued)

(52) U.S. Cl.
CPC ................ *B22C 1/188* (2013.01); *B22C 1/02* (2013.01); *B22C 1/16* (2013.01); *B22C 9/02* (2013.01);
(Continued)

(58) Field of Classification Search
CPC .... B22C 9/00; B22C 9/02; B22C 9/12; B22C 1/188; B22C 1/00; B22C 1/02;
(Continued)

(56) References Cited

U.S. PATENT DOCUMENTS 4,691,756 A   9/1987 Suzuki et al.
4,767,801 A   8/1988 Suzuki et al.
(Continued)

FOREIGN PATENT DOCUMENTS

CN   103833269 A   6/2014
EP   0 219 645       8/1989
(Continued)

OTHER PUBLICATIONS

Indian First Examination Report (Application No. 202037031244) dated Mar. 3, 2022.
Chinese Office Action (Application No. 201880084119.8) dated Mar. 1, 2021 (with English translation).
International Search Report and Written Opinion (Application No. PCT/JP2018/048488) dated Apr. 9, 2019.

*Primary Examiner* — Kevin P Kerns
*Assistant Examiner* — Steven S Ha
(74) *Attorney, Agent, or Firm* — Burr & Brown, PLLC

(57) ABSTRACT

Provided are: a coated sand having improved fluidity and being capable of improving a filling rate of a casting mold to be obtained; and a coated sand for advantageously manufacturing a casting mold having excellent strength, which coated sand provides a casting mold with good mold-releasability and collapsibility, gives cast products a favorable casting surface, and effectively improves sand adhesion on cast products. The coated sand is formed as a dry granular material having fluidity at room temperature, in which the surface of a refractory aggregate is coated with a solid layer of a water-soluble inorganic binder, and spherical particles of silicone resin having binder-repellency exist on the surface of the binder layer, or form a layer on the surface of the binder layer, a part of the spherical particles being not covered with the water-soluble inorganic binder and being exposed.

18 Claims, 1 Drawing Sheet

(51) Int. Cl.
  *B22C 9/02* (2006.01)
  *C04B 20/00* (2006.01)
  *C04B 20/10* (2006.01)
  *C04B 28/26* (2006.01)
  *B22C 1/16* (2006.01)
  *B22D 23/00* (2006.01)

(52) U.S. Cl.
  CPC ...... *C04B 20/0016* (2013.01); *C04B 20/1037* (2013.01); *C04B 28/26* (2013.01); *B22D 23/006* (2013.01)

(58) Field of Classification Search
  CPC ..... B22C 1/16; B22D 23/006; C04B 20/0016; C04B 20/1037; C04B 28/26
  See application file for complete search history.

(56) References Cited

U.S. PATENT DOCUMENTS

| | | |
|---|---|---|
| 2008/0099180 A1 | 5/2008 | Weicker et al. |
| 2017/0050236 A1 | 2/2017 | Tanaka |

FOREIGN PATENT DOCUMENTS

| | | |
|---|---|---|
| GB | 763812 A | 12/1956 |
| JP | H09-070641 A1 | 3/1997 |
| JP | 2008-511447 A1 | 4/2008 |
| JP | 2010-131665 A1 | 6/2010 |
| JP | 2012-076115 A1 | 4/2012 |
| JP | 4953511 B2 | 6/2012 |
| JP | 2018-203597 A1 | 12/2018 |
| WO | 2015/194550 A1 | 12/2015 |
| WO | 2018/147419 A1 | 8/2018 |

COATED SAND, PRODUCTION METHOD FOR SAME, AND PRODUCTION METHOD FOR CASTING MOLD

This application is a continuation of the International Application No. PCT/JP2018/048488 filed on Dec. 28, 2018, which claims the benefit under 35 U.S.C. § 119(a)-(d) of Japanese Application No.2017-253877 filed on Dec. 28, 2017, the entireties of which are incorporated herein by reference.

BACKGROUND OF THE INVENTION

Field of the Invention

The present invention relates to a coated sand and a method of producing the same, and a method of manufacturing a casting mold. More particularly, the invention relates to a coated sand capable of advantageously providing an intended casting mold and a method of producing such a coated sand. The invention further relates to a method of manufacturing an excellent casting mold by using the coated sand.

Description of Related Art

As a casting mold used for casting molten metal, one which is obtained by forming a coated sand (mold material) into a desired shape has been employed. The coated sand used here is obtained by coating a molding sand consisting of a refractory aggregate, with a suitable binder. As examples of the binder, inorganic binders such as a water glass, and organic binders using a resin such as a phenolic resin, a furan resin and a urethane resin are known, and methods of forming self-curing molds by using these binders have been put to practical use.

Meanwhile, a coated sand obtained by using the above-mentioned binder tends to suffer from deterioration of fluidity due to the presence of the binder. Thus, the coated sand has inherent problems that filling deficiency may be caused in a forming cavity of a metal die (forming mold) for forming a casting mold, and that the casting mold obtained therefrom does not have a sufficient degree of strength, for example. In particular, in a coated sand obtained by using an organic binder among the binders, volatile components remaining in the organic binder are emitted to the outside to generate an odor, at the time of producing the coated sand, and manufacturing a casting mold by using the coated sand. There are also problems that organic components in the organic binder are decomposed to generate gas at the time of casting molten metal, resulting in gas deficiency in the obtained casting mold and deterioration of the working environment.

For this reason, recently, inorganic binders which do not contain any organic component have drawn attention. However, a coated sand obtained by using the inorganic binder has an inherent problem that a casting mold formed of the coated sand does not have a sufficient degree of collapsibility after casting process. Besides, the strength of the formed casting mold is undesirably deteriorated by moisture-absorption.

In view of the above, JP2008-511447A suggests a coated sand as a molding mixture for manufacturing a metal processing mold, which coated sand is formed by using at least one refractory mold raw material and at least one binder based on a water glass. To the binder, a particulate metal oxide, which is selected from the group consisting of silicon dioxide, aluminum oxide, titanium oxide and zinc oxide, is added at a predetermined ratio. The addition of the particulate metal oxide is considered to permit an advantage of improvements of initial mold strength (mold strength immediately after the production), mold strength after storage for a long period of time, and moisture resistance of the mold, for example.

However, the molding mixture (coated sand) containing the particulate metal oxide along with the water glass as the binder has a problem that the water glass adheres also to the particulate metal oxide by mixing of the components, whereby the molding mixture adheres to a metal die at an increased number of points. Thus, a casting mold to be manufactured by the metal die suffers from poor mold-releasability, so that breakage of the casting mold may be caused at the time of its removal from the metal die. Furthermore, in the case where the binder (water glass) is prepared to have a low viscosity for improving the mold strength, the binder having a low viscosity is allowed to move within the metal die (forming cavity) due to an influence of air pressure at the time of casting, even after the molding mixture (coated sand) is blown into the metal die. As a result, the binder is unevenly distributed on an inner surface of the forming cavity, so that the releasability of the casting mold tends to be further deteriorated. Besides, where the molding mixture (coated sand) has a high degree of fillability, particles of the mold raw material (aggregate) mutually adhere at an increased number of points, resulting in a problem of poor collapsibility of the obtained casting mold.

JP4953511B2 discloses a molding sand composition (coated sand) comprising a refractory particulate aggregate and non-hollow spherical particles having an average particle diameter of a predetermined ratio in terms of an average particle diameter of the refractory particulate aggregate, the non-hollow spherical particles being selected from the group consisting of silica, silicone resins, alumina glass, mullite, polyethylene, polypropylene, polystyrene, (meth)acrylic acid resins and fluorine resins. It is said that the molding sand composition has improved fluidity, and is suitably used for manufacturing a complicated mold and a high-strength mold. However, such improved fluidity of the molding sand composition is not satisfactory for molding a casting mold having a shape getting more and more complicated in recent years, and a further improvement of fluidity is desired. In addition, it is also required to improve the casting surface of a cast product obtained in the casting process employing a casting mold formed of the molding sand composition, and also to prevent sand adhesion to the cast product.

Furthermore, JP2012-76115A discloses a refractory substance coated with a binder (coated sand) having good fluidity, in which the surface of a refractory aggregate is coated with a solid coating layer containing a water-soluble inorganic compound such as a water glass as a binder. The document also discloses that the fluidity of the refractory substance coated with a binder can be improved by including a lubricant in the coating layer. However, the fluidity of the refractory substance, and the filling rate of the casting mold, cannot be sufficiently improved by merely coating the surface of the refractory aggregate with the solid coating layer of the binder formed of the water-soluble inorganic compound such as the water glass, and further including the lubricant in the coating layer. In addition, there are inherent problems that the strength of a casting mold formed of the refractory substance coated with a binder is not satisfactory, and that the casting surface of a cast product manufactured by using the casting mold is not good, for example.

SUMMARY OF THE INVENTION

The present invention was completed in view of the background art described above. Therefore, a problem to be solved by the present invention is to provide a coated sand with further improved fluidity, which permits an improvement of a filling rate of a casting mold obtained by molding the coated sand. It is another problem to be solved by the invention to provide a coated sand for advantageously manufacturing a casting mold having excellent strength which yields a cast product with a good casting surface and effectively prevents sand adhesion to the cast product. In addition, the present invention also intends to provide a method of advantageously producing the coated sand having the above-mentioned excellent properties, and a method of advantageously manufacturing the casting mold having the above-mentioned excellent properties by using the coated sand.

In order to solve the above-mentioned problems, the present invention can be preferably embodied in various modes which will be described below. It is to be understood that the modes and technical features of the present invention are not limited to those described below, and can be recognized based on the inventive concept disclosed in the specification and the attached drawings taken as a whole.

(1) A coated sand, wherein a surface of a refractory aggregate is coated with a binder layer in the solid state formed by using a water-soluble inorganic binder, and wherein spherical particles of silicone resin having binder-repellency exist on a surface of the binder layer, or form a layer on the surface of the binder layer, a part of the spherical particles being not covered with the water-soluble inorganic binder and being exposed, whereby the coated sand is constituted as a dry granular material having fluidity at room temperature.

(2) The coated sand according to the above-mentioned mode (1), wherein an average particle diameter of the spherical particles is within a range of 0.01 μm-50 μm.

(3) The coated sand according to the above-mentioned mode (1) or (2), wherein a content of the spherical particles is within a range of 0.1-500 parts by mass per 100 parts by mass of a solid content of the water-soluble inorganic binder in the coated sand.

(4) The coated sand according to any one of the above-mentioned modes (1) to (3), wherein the spherical particles are resin particles whose main component is organopolysiloxane.

(5) The coated sand according to the above-mentioned mode (4), wherein the organopolysiloxane is silsesquioxane.

(6) The coated sand according to the above-mentioned mode (5), wherein the silsesquioxane is polymethylsilsesquioxane.

(7) The coated sand according to any one of the above-mentioned modes (1) to (6), wherein the spherical particles have binder-repellency characterized in that, when the water-soluble inorganic binder in the liquid state used for forming the binder layer is dripped on a horizontal plane formed of the spherical particles, a contact angle between the water-soluble inorganic binder and the horizontal plane is not less than 90°.

(8) The coated sand according to any one of the above-mentioned modes (1) to (7), wherein the spherical particles have a weight reduction ratio within a range of 5-50%, when the spherical particles are subjected to heating in a thermogravimetric/differential thermal analyzer from room temperature to 700° C. in an air atmosphere.

(9) The coated sand according to any one of the above-mentioned modes (1) to (8), further comprising a moisture-resistance improving agent.

(10) The coated sand according to any one of the above-mentioned modes (1) to (9), wherein the water-soluble inorganic binder contains a water glass as its main component.

(11) A method of producing a coated sand, wherein a water-soluble inorganic binder in the liquid state and spherical particles of silicone resin having binder-repellency are kneaded or mixed with a heated refractory aggregate to form a mixture, and water in the obtained mixture is evaporated, so that the water-soluble inorganic binder forms a binder layer in the solid state on a surface of the refractory aggregate, while the spherical particles exist on a surface of the binder layer, or form a layer on the surface of the binder layer, a part of the spherical particles being not covered with the water-soluble inorganic binder and being exposed, whereby the coated sand is constituted as a dry granular material having fluidity at room temperature.

(12) A method of producing a coated sand, wherein a water-soluble inorganic binder in the liquid state is added to and kneaded or mixed with a heated refractory aggregate, spherical particles of silicone resin having binder-repellency are further, with a time lag, added to and kneaded or mixed with the refractory aggregate including the binder to form a mixture, and water in the obtained mixture is evaporated, so that the water-soluble inorganic binder forms a binder layer in the solid state on a surface of the refractory aggregate, while the spherical particles exist on a surface of the binder layer, or form a layer on the surface of the binder layer, a part of the spherical particles being not covered with the water-soluble inorganic binder and being exposed, whereby the coated sand is constituted as a dry granular material having fluidity at room temperature.

(13) The method of producing a coated sand according to the above-mentioned mode (11) or (12), wherein the spherical particles have binder-repellency characterized in that, when the water-soluble inorganic binder in the liquid state is dripped on a horizontal plane formed of the spherical particles, a contact angle between the water-soluble inorganic binder and the horizontal plane is not less than 90°.

(14) The method of producing a coated sand according to the above-mentioned mode (11), (12) or (13), wherein the water-soluble inorganic binder in the liquid state is formed by separately adding a predetermined water-soluble inorganic binder and a predetermined amount of water at the time of preparation of the mixture.

(15) A method of manufacturing a casting mold, wherein the coated sand according to any one of the above-mentioned modes (1) to (10) is filled in a forming mold, subjected to passing of steam, and held within the forming mold so as to be solidified or cured, whereby the desired casting mold is obtained.

(16) A method of manufacturing a casting mold, wherein water is added to the coated sand according to any one of the above-mentioned modes (1) to (10), to obtain a moisturized coated sand, the moisturized coated sand is filled in a forming mold, and the moisturized coated sand is held within the forming mold to be solidified or cured, whereby the desired casting mold is obtained.

As described above, in the coated sand according to the invention, the binder layer in the solid state, or the solid binder layer, is formed of the water-soluble inorganic binder so as to coat the surface of the refractory aggregate, and the spherical particles of silicone resin having binder-repellency exist on or adhere to the surface of the binder layer, or form a layer on the surface of the binder layer, a part of the spherical particles being not covered with the water-soluble inorganic binder and being exposed, whereby the coated sand is constituted as a dry granular material having fluidity at room temperature. Thus, particles of the coated sand are contacted with each other via the spherical particles of silicone resin on their surfaces, to thereby effectively reduce friction between the particles of the coated sand. As a result, the fluidity of the coated sand is remarkably improved, and fillability of the coated sand into a forming cavity of a forming mold for casting is also effectively improved. Furthermore, the particles of the coated sand move to reduce gaps between themselves after filled, resulting in a further improved filling rate of the forming mold.

In addition, the spherical particles of silicone resin having binder-repellency move to the surfaces of the particles of the coated sand so as to exist on the surface of the water-soluble inorganic binder layer, whereby a casting mold having excellent strength is advantageously obtained from the coated sand. In the casting process employing the casting mold formed of the coated sand, the casting surface of a cast product to be obtained is effectively improved, that is, a quite smooth casting surface is achieved. Furthermore, sand adhesion, that is, adhesion of the particles of the coated sand, to the cast product is also effectively inhibited or reduced, thereby permitting an advantageous improvement of the quality of the cast product.

DETAILED DESCRIPTION OF THE INVENTION

Figure 1:
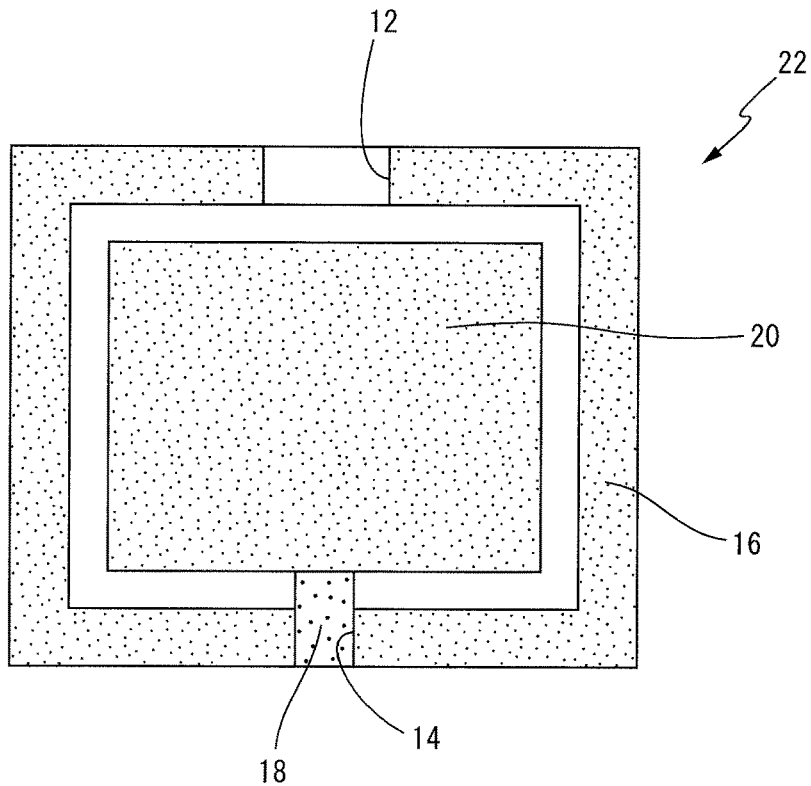
FIG. 1 is a schematic longitudinal view showing a sand mold for casting test used in a collapsibility test in Examples.

Meanwhile, a coated sand (mold material) including a refractory aggregate and a water-soluble inorganic binder is classified into a coated sand in a dry state and a coated sand in a wet state, depending on its state after production. The coated sand in the dry state intended in the present invention is constituted by forming a coating layer (binder layer) in the solid state, or a solid coating layer, on the surface of the refractory aggregate. The coated sand does not have adhesiveness (does not exhibit adhesiveness) while remaining in in the dry state, but exhibits adhesiveness upon a supply of water by passing of steam and the like, due to dissolution of the coating layer (water-soluble inorganic binder) coating the surface of the refractory aggregate. Then, the coated sand in the dry state is filled in a forming mold while exhibiting the adhesiveness by addition of water, for example, and heated and dried. Alternatively, the coated sand in the dry state is filled in a forming mold while remaining in the dry state, receives a supply of water by passing of steam and the like into the forming mold, and is heated and dried. Then, solidification or curing reaction progresses in both cases, whereby a desired casting mold is formed. Whether a coated sand shows the dry state or the wet state depends on a water content or moisture percentage with respect to a solid content of the water-soluble inorganic binder in the coated sand. The water content at which a coated sand shows the dry state or the wet state varies according to a kind of the water-soluble inorganic binder. For example, where the water-soluble inorganic binder is a water glass, a coated sand having a water content equivalent to 5-55% by mass of the solid content of the water glass shows the dry state, while a coated sand having a water content equivalent to more than 55% by mass of the solid content of the water glass shows the wet state.

The coated sand (mold material) in the dry state intended in the invention indicates a coated sand (mold material) having fluidity at room temperature, and, regardless of its water content, whose value of dynamic angle of repose can be obtained upon measurement. The dynamic angle of repose is measured as follows. The coated sand (mold material) is accommodated in a cylinder whose one end has a transparent and planar surface (for example, the coated sand is accommodated in a container having a diameter of 7.2 cm and a height of 10 cm, such that the volume of the coated sand accommodated in the container is equal to the half of the volume of the container). The container is rotated about a horizontal axis at a constant speed (for example, at 25 rpm), whereby a layer of the coated sand (mold material) flowing within the cylinder has a flat inclined surface. Here, the angle between the inclined surface and the horizontal plane is the dynamic angle of repose. The coated sand in the dry state preferably has a dynamic angle of repose of not more than 80°, more preferably not more than 45°, and further preferably not more than 30°. In particular, a coated sand having the dynamic angle of repose of not more than 45° can be advantageously obtained by using a spherical refractory aggregate. Meanwhile, when the coated sand (mold material) is wet and does not flow in the cylinder so that the flat inclined surface of the layer of the coated sand (mold material) is not formed, the dynamic angle of repose cannot be measured. In this case, the coated sand (mold material) is referred to as the coated sand in the wet state.

The refractory aggregate constituting the coated sand in the dry state according to the invention is a refractory material which serves as a base material of the casting mold. Any one of the various refractory particulate or powder materials conventionally used for the casting mold may be used as the refractory aggregate. Specific examples of the refractory aggregate include: silica sand; a regenerated silica sand; special sands such as alumina sand, olivine sand, zircon sand and chromite sand; slag particles such as ferro-chromium slag, ferronickel slag and a converter slag; artificial particles such as alumina particles and mullite particles, and regenerated particles thereof; alumina ball; and magnesia clinker. The above-mentioned refractory aggregates may be: a new or fresh sand; a regenerated or reclaimed sand which has been used once or a plurality of times as a molding sand to form the casting mold; or a mixture of the regenerated or reclaimed sand and the new or fresh sand. The refractory aggregate generally has a particle size of about AFS 40-130, and preferably 60-110.

Among the above-mentioned refractory aggregates, spherical aggregates are recommended for advantageously achieving the object of the invention. In particular, a refractory aggregate having a coefficient of angularity of not more than 1.2, and more preferably a coefficient of angularity within a range of 1.0-1.1, is preferred. Using the refractory aggregate having the coefficient of angularity of not more than 1.2 contributes to an improvement of fluidity and ease of filling (fillability) of the coated sand, and an increase of contact points between the particles of the refractory aggregate, whereby amounts of the binder and additives required for achieving a desired degree of strength can be reduced. Here, the coefficient of angularity of the aggregate used here, which is also called an index of angularity, is employed as one of the standards defining the external shape of a particle. A particle shape becomes closer to a sphere (true sphere) as the coefficient of angularity of the particle approaches to 1. The coefficient of angularity is defined by a value calculated from a surface area measured by various known methods. For example, the value of the coefficient of angularity is obtained by measuring an actual surface area of 1g of the sand particles of the aggregate with a measuring device for determining the surface area of sand (available from GEORG FISCHER LTD.), and dividing the obtained actual surface area by a theoretical surface area of the particles. The theoretical surface area is a surface area obtained on the supposition that all the sand particles of the aggregate are spherical.

The water-soluble inorganic binder used in the coated sand according to the invention is suitably selected from various known binders. Specifically, a binder containing, as its main component, at least one selected from the group comprising a water glass, sodium chloride, sodium phosphate, sodium carbonate, sodium vanadate, sodium aluminum oxide, potassium chloride, potassium carbonate, magnesium sulfate, aluminum sulfate, sodium sulfate, nickel sulfate and manganese sulfate is advantageously used. Among them, the water glass and a binder containing the water glass as its main component are particularly preferred in view of their handling ease and the strength of a finally-obtained casting mold. The water glass is an aqueous solution of a water-soluble silicate compound including, for example, sodium silicate, potassium silicate, sodium metasilicate, potassium metasilicate, lithium silicate and ammonium silicate. Among the above-mentioned water-soluble silicate compounds, sodium silicate (silicate of soda) is preferably used in the invention. In addition, the binder may contain any water-soluble binder, for example a thermosetting resin, a saccharide, a protein, a synthetic polymer, a salt and an inorganic polymer, as long as the binder contains the water glass as the main component. Where another water-soluble binder is contained together with the water glass, the ratio of the water glass in the entire binder is preferably not less than 60% by mass, more preferably not less than 80% by mass, and further preferably not less than 90% by mass.

Sodium silicate is generally classified into No. 1 to No. 5 based on its $SiO_2/Na_2O$ molar ratio. Specifically described, sodium silicate No. 1 has the molar ratio $SiO_2/Na_2O$ within a range between 2.0 and 2.3, sodium silicate No. 2 has the molar ratio $SiO_2/Na_2O$ within a range between 2.4 and 2.6, sodium silicate No. 3 has the molar ratio $SiO_2/Na_2O$ within a range between 2.8 and 3.3, sodium silicate No. 4 has the molar ratio $SiO_2/Na_2O$ within a range between 3.3 and 3.5, and sodium silicate No. 5 has the molar ratio $SiO_2/Na_2O$ within a range between 3.6 and 3.8. Among these, the sodium silicates No. 1 to No. 3 are also specified in JIS-K-1408. Any one or a mixture of the above-mentioned sodium silicates may be used in the invention. It is possible to control the molar ratio $SiO_2/Na_2O$ by mixing at least two kinds of sodium silicate.

In the invention, the sodium silicate constituting the water glass used as the binder generally has a molar ratio $SiO_2/Na_2O$ not smaller than 1.9, preferably not smaller than 2.0, and more preferably not smaller than 2.1, in order to effectively obtain the coated sand according to the invention. Among the sodium silicates classified as described above, the sodium silicates equivalent to Nos. 1 to 3, more preferably Nos. 1and 2, and further preferably No. 2 are advantageously used. The sodium silicates Nos. 1 to 3 give the coated sand having satisfactory properties, with a high degree of stability, within a wide range of concentration of these sodium silicates in the water glass. To achieve a high degree of mold strength, the sodium silicates Nos. 1 and 2 are selected; and considering the balance of the properties of an obtained casting mold such as moisture resistance as a whole, the sodium silicate No. 2 is selected. The upper limit of the molar ratio $SiO_2/Na_2O$ is determined according to properties of the water glass in the state of an aqueous solution, generally to be not larger than 3.5, preferably not larger than 3.2, and more preferably not larger than 2.7. Where the molar ratio $SiO_2/Na_2O$ is smaller than 1.9, a large amount of alkali comes to be present in the water glass, thereby increasing solubility of the water glass to water. As a result, it is possible that the coated sand tends to easily deteriorate by moisture absorption. On the other hand, where the molar ratio $SiO_2/Na_2O$ of sodium silicate is larger than 3.5, its solubility to water is low, so that a sufficient surface area of mutual bonding of the particles of the refractory aggregate may not be secured, resulting in a problem of deterioration of the strength of the finally-obtained casting mold.

The water glass used in the invention indicates an aqueous solution of the sodium silicate compound dissolved in water. In the production of the coated sand according to the invention, a commercially available aqueous solution of the water glass is used as an undiluted solution as purchased, or as a diluted solution obtained by adding water to the undiluted solution. A nonvolatile content (water glass components) in the water glass is called a solid content, and is calculated by subtracting amounts of volatile substances such as the water and a solvent contained in the water glass, from the amount of the water glass. The thus calculated solid content corresponds to the amount of the soluble silicate compound such as the sodium silicate described above. A higher solid content of the water glass indicates a higher concentration of the silicate compounds in the water glass. Where the aqueous solution of the water glass consists solely of the undiluted solution, the solid content of the water glass corresponds to the amount of a portion of the undiluted solution other than the water contained therein. On the other hand, where the diluted solution obtained by diluting the undiluted solution with water is used as the aqueous solution of the water glass, the solid content of the water glass corresponds to the amount of the components excluding the water contained in the undiluted solution and the water used to dilute the undiluted solution.

The solid content of the water glass is adequately determined depending on the kinds of water glass components (soluble silicate compounds), for example, but preferably held within a range of 20-50% by mass. By preparing the aqueous solution of the water glass containing an adequate amount of water glass components corresponding to the solid content, and mixing or kneading such an aqueous solution with the refractory aggregate, a mixture in which the water glass components are evenly and uniformly distributed over the refractory aggregate can be obtained, so that a desired casting mold can be advantageously manufactured according to the invention. Where the water glass components (soluble silicate compounds) contained in the water glass has an undesirably low concentration such that the total amount of the water glass components (solid content) is less than 20% by mass, it is necessary to dry the mixture of the refractory aggregate, the spherical particles of silicone resin and the water glass at a higher temperature and for a longer period of time in the production of the coated sand in the dry state. On the other hand, where the solid content of the water glass is excessively high, it is difficult to obtain the mixture in which the water glass components are evenly and uniformly distributed over the refractory aggregate. As a result, there arise problems in improving properties of an intended casting mold. Therefore, the water glass in the state of an aqueous solution is preferably prepared such that its solid content is not more than 50% by mass, that is to say, its water content is not less than 50% by mass.

In addition to the above-mentioned water glass, sodium chloride, sodium phosphate, sodium carbonate, sodium vanadate, sodium aluminum oxide, potassium chloride, potassium carbonate, magnesium sulfate, aluminum sulfate, sodium sulfate, nickel sulfate, manganese sulfate and the like are well known as the water-soluble inorganic binder. These binders are suitably selected and used in the invention so as to exhibit characteristics indicated in the above-mentioned JP2012-76115A.

In the coated sand according to the invention, the above-mentioned various water-soluble inorganic binders are used in an amount of 0.1-2.5 parts by mass, and particularly advantageously 0.2-2.0 parts by mass per 100 parts by mass of the refractory aggregate, in terms of its mass where the binder is a solid, and in terms of its mass of the solid content where the binder is a liquid. Here, the solid content of the water glass is measured in the following manner. First, 10 g of a sample of the water glass is accommodated in a container (length: 9 cm; width: 9 cm; depth: 1.5 cm, not sealed) formed of an aluminum foil, and weighed to thereby obtain a value of the mass of the container accommodating the sample before drying. Subsequently, the container accommodating the sample is placed on a heating plate whose temperature is held at 180±1° C., and left on the heating plate for 20 minutes. The container accommodating the sample is then reversed upside down and held on the heating plate for another 20 minutes. Then, the container accommodating the sample is removed from the heating plate and cooled within a desiccator, and the container is weighed to thereby obtain a value of the mass of the container accommodating the sample after drying. The solid content (% by mass) is calculated according to the following formula:

Solid content (% by mass)={[Mass (g) of the container accommodating the sample after drying−mass (g) of the container]/[Mass (g) of the container accommodating the sample before drying−mass (g) of the container]}×100

Where the water-soluble inorganic binder is used in an undesirably small amount in the coated sand in the dry state according to the invention, it is difficult to form a mixture (coated sand) in which the water-soluble inorganic binder is evenly and uniformly distributed over the refractory aggregate. On the other hand, where the water-soluble inorganic binder is used in an excessively large amount, there may be problems, too. That is, in the case of the coated sand in the dry state, an extra amount of the water-soluble inorganic binder adheres to the surface of the refractory aggregate, thereby preventing the formation of a uniform coating layer, and there may arise a problem that the sand particles of the coated sand adhere to each other before formation of the casting mold, resulting in agglomeration (formation of a complex of the particles). The above-mentioned problems have harmful influences on the physical properties of the finally-obtained casting mold, and may cause difficulty in removing the molding sand of a casting core (removal of the solidified coated sand) after casting of metal.

In the invention, along with the above-mentioned water-soluble inorganic binder in the liquid state, spherical particles of silicone resin having binder-repellency are added to and mixed with the predetermined refractory aggregate, to thereby obtain the intended coated sand in the dry state. Since the spherical particles of silicone resin used here have binder-repellency, they come to exist on the surface of the particles of the coated sand to be obtained, that is, the surface of a layer of the water-soluble inorganic binder (binder layer) coating the refractory aggregate, or alternatively, they form a layer on the surface of the binder layer. As a result, when the coated sand is made to flow so as to be filled in a forming mold (metal die), the particles of the coated sand are allowed to contact with each other via the spherical particles of silicone resin. Thus, friction between the particles of the coated sand is effectively reduced, and the fluidity of the coated sand is advantageously improved.

As described above, the coated sand in the dry state according to the invention is constituted to have the layer of the water-soluble inorganic binder as the binder layer on the surface of the refractory aggregate, such that the binder layer coats the refractory aggregate, and further the binder layer has the spherical particles of silicone resin adhering to the surface of the binder layer, or forming the layer on the surface of the binder layer. Since the spherical particles of silicone resin have binder-repellency, a part of the spherical particles is exposed by projecting from the surface of the binder layer, and a surface of the exposed part is not covered with the water-soluble inorganic binder, while the spherical particles exist on the surface of the binder layer, or form the layer on the surface of the binder layer. Here, by the description that the spherical particles of silicone resin exist on the surface of the binder layer, or form the layer on the surface of the binder layer, it is meant that the coated sand is constituted such that the spherical particles are made to firmly stick to the surface of the binder layer in the solid state by means of the water-soluble inorganic binder as an adhesive, so as to be distributed on the surface of the refractory aggregate. In some embodiments, the coated sand is constituted such that the spherical particles are buried in the binder layer, with a part of the particles being exposed on the surface of the binder layer, and in other embodiments, the coated sand is constituted such that the spherical particles form a layer on the surface of the binder layer. That is, where the spherical particles are added in a small amount, they sparsely exist on the surface of the binder layer, and where the spherical particles are added in a large amount, they form a layer on the surface of the binder layer.

When forming a casting mold, the water-soluble inorganic binder on the surface of the coated sand adheres to a metal blow tank or a passageway of a nozzle in a molding apparatus, resulting in deterioration of the fluidity of the coated sand. However, in the coated sand according to the invention, the spherical particles of silicone resin on the surface of the sand particles are present between a metal surface of members of the molding apparatus and the water-soluble inorganic binder, and exhibit the effect of protecting the metal surface of the molding apparatus. Consequently, adhesion of the coated sand to the blow tank and the passageway of the nozzle in the molding apparatus is effectively prevented or reduced. In addition, after the coated sand according to the invention is filled in the molding apparatus, the particles of the coated sand are allowed to move to reduce gaps between themselves, whereby the fillability of the coated sand is further improved.

Since the surfaces of the spherical particles of silicone resin used in the invention are binder-repellent, the spherical particles are easy to move to the surface of the layer of the water-soluble inorganic binder (binder layer), when the layer of the water-soluble inorganic binder constituting the coated sand in the dry state according to the invention is made swollen by a supply of water to the coated sand. The spherical particles thus come to be present on the surface of the layer of the water-soluble inorganic binder. In addition, the spherical shape of the particles permits the coated sand to become further slippery, whereby the fluidity of the coated sand is further improved. Furthermore, the presence of the spherical particles permits advantageously preventing adhesion of the water-soluble inorganic binder to the forming mold, so that the coated sand has an advantage of giving the casting mold obtained therefrom significantly improved releasability from the forming mold. The binder-repellency of the spherical particles of silicone resin permits a further advantage. That is, when a point of adhesion (bridge) is formed between the particles of the aggregate by the water-soluble inorganic binder, the spherical particles move to the surface of a part of the water-soluble organic binder constituting the point of adhesion, that is, move to the periphery of the point of adhesion. The spherical particles are thus effectively prevented from being taken in the inside of the part of the water-soluble organic binder. As a result, the particles of the aggregate are advantageously bonded with each other at the part of the water-soluble organic binder without any impurity, so that the strength of the casting mold to be obtained is effectively secured, thereby contributing to maintenance and an improvement of the strength.

The binder-repellency mentioned in the invention indicates a property of repelling the water-soluble inorganic binder in the liquid state used for forming the coated sand. In the invention, the spherical particles of silicone resin having binder-repellency are defined as follows. Initially, the spherical particles are scattered on a given support so as to form a horizontal plane with the spherical particles, and the water-soluble inorganic binder in the liquid state used for forming the coated sand is dripped on the horizontal plane. The spherical particles are defined to have binder-repellency when a contact angle between the drip and the horizontal plane is not less than 90°. The contact angle is preferably not less than 100°, more preferably not less than 120°, and further preferably not less than 125°.

The spherical particles of silicone resin have a shape generally recognized as a sphere, and are not necessarily required to be in the form of true sphere. Usually, the spherical particles having a sphericity of not less than 0.5, preferably not less than 0.7, and more preferably not less than 0.9 are advantageously used. Here, the sphericity is defined by a mean value of aspect ratios calculated from projected shapes of 10 mutually independent particles arbitrarily selected for observation with a scanning electron microscope. The aspect ratio indicates a ratio of the short diameter to the long diameter.

The spherical particles of silicone resin having binder-repellency used in the invention preferably have a characteristic that its weight reduction ratio is within a range of 5-50%, preferably 10-30%, and more preferably 10-20%, when the spherical particles are subjected to heating in a thermogravimetric/differential thermal analyzer from room temperature to 700° C. in an air atmosphere. Generally, the coated sand formed by using the water-soluble inorganic binder has an inherent problem that a casting mold obtained therefrom does not exhibit good collapsibility after the casting mold is used for casting, while such a coated sand has an advantage that it does not generate gas because the binder does not include organic components. By adding the spherical particles of silicone resin having binder-repellency according to the invention, the collapsibility of the casting mold can be improved because of gas generated from organic components contained in the spherical particles. To achieve this effect, the above-mentioned weight reduction ratio is preferably set to be not less than 5%. On the other hand, the weight reduction ratio is preferably set to be not more than 50%, to thereby prevent generation of a large amount of gas at the time of casting and gas deficiency in a cast product.

As the spherical particles of silicone resin having binder-repellency described above, particles having a smaller diameter than that of the refractory aggregate are advantageously used. Specifically, the average particle diameter of the particles is within a range of 0.01 µm-50 µm, preferably 0.05 µm-25 µm, more preferably 0.1 µm-10 µm, and further preferably 0.2 µm-3 µm. The spherical particles having the above-mentioned average particle diameter are smaller than the refractory aggregate to be mixed with in the particle size, so that they easily enter into the refractory aggregate, and are uniformly dispersed among the particles of the refractory aggregate. Thus, the spherical particles come to be uniformly present on the surfaces of the particles of the coated sand.

In the coated sand according to the invention, the spherical particles of silicone resin having binder-repellency are used in an amount of 0.1-500 parts by mass, preferably 0.3-300 parts by mass, more preferably 0.5-200 parts by mass, further preferably 0.75-100 parts by mass, and the most preferably 1-50 parts by mass, per 100 parts by mass of the solid content of the water-soluble inorganic binder constituting the coating layer on the surface of the refractory aggregate. In summary, the effects according to the present invention can be more advantageously achieved by including the spherical particles of silicone resin having the predetermined average particle diameter in the coating layer of the water-soluble inorganic binder which is formed on the refractory aggregate, in the above-mentioned predetermined amount. The average particle diameter is calculated from a particle size distribution measured with a laser diffraction-type particle counter, for example.

The particles of silicone resin used in the invention as described above are not limited, as long as the particles are spherical and have the binder-repellency. It is required only that the spherical resin particles have the binder-repellency on their surface. Thus, the same effect as the invention can be also achieved by using spherical particles whose surfaces alone are coated with a silicone resin having binder-repellency. However, in view of the possibilities of breakage of the spherical particles themselves and peeling off of the coating, spherical particles formed of a single component of a binder-repellent silicone resin are more preferably used. The silicone resin is preferably a resin whose main component is organopolysiloxane, and the organopolysiloxane is more preferably silsesquioxane. Furthermore, particularly preferably, the silsesquioxane is polymethylsilsesquioxane. Where the organopolysiloxane constituting the spherical particles is silsesquioxane, and further the silsesquioxane is polymethylsilsesquioxane, spherical particles to be obtained enjoy an excellent heat resistance along with an effective binder-repellency, because the particles formed of polymethylsilsesquioxane have a higher degree of silicon content. With the above-mentioned properties, the spherical particles are not likely to suffer from thermal decomposition and melting under the heat at the time of molding the casting mold, so that the particles can advantageously maintain their spherical shape even at the time of molding and casting. Consequently, the fillability of the coated sand and the effect of improving the strength of the casting mold are advantageously maintained. Besides, the effects of preventing sand adhesion and improving the casting surface can be further advantageously exhibited at the time of casting, because the above-mentioned spherical particles permit reduction of odor and smoke at the time of molding.

The coated sand according to the invention suitably contains various additives such as a curing agent and a curing accelerator, as known well. In particular, a moisture-resistance improving agent is preferably contained together with the above-mentioned spherical particles of silicone resin. Where the coated sand contains the moisture-resistance improving agent, synergism between a secondary effect of the binder-repellency of the spherical particles and the effect of the moisture-resistance improving agent is exhibited at the time of forming the casting mold so as to further improve the moisture-resistance of the finally-obtained casting mold.

Any moisture-resistance improving agent conventionally used in the coated sand may be used in the invention, as long as it does not hinder the effect of the invention. Specific examples of the moisture-resistance improving agent include: carbonates such as zinc carbonate, basic zinc carbonate, ferrous carbonate, manganese carbonate, copper carbonate, aluminum carbonate, barium carbonate, magnesium carbonate, calcium carbonate, lithium carbonate, potassium carbonate and sodium carbonate; borates such as sodium tetraborate, potassium tetraborate, lithium tetraborate, ammonium tetraborate, calcium tetraborate, strontium tetraborate, silver tetraborate, sodium metaborate, potassium metaborate, lithium metaborate, ammonium metaborate, calcium metaborate, silver metaborate, copper metaborate, lead metaborate and magnesium metaborate; sulfates such as sodium sulfate, potassium sulfate, lithium sulfate, magnesium sulfate, calcium sulfate, strontium sulfate, barium sulfate, titanium sulfate, aluminum sulfate, zinc sulfate and copper sulfate; phosphates such as sodium phosphate, sodium hydrogen phosphate, potassium phosphate, potassium hydrogen phosphate, lithium phosphate, lithium hydrogen phosphate, magnesium phosphate, calcium phosphate, titanium phosphate, aluminum phosphate and zinc phosphate; hydroxides such as lithium hydroxide, magnesium hydroxide, calcium hydroxide, strontium hydroxide, barium hydroxide, aluminum hydroxide and zinc hydroxide; and oxides of silicon, zinc, magnesium, aluminum, calcium, lithium, copper, iron, boron and zirconium. Among them, the basic zinc carbonate, ferrous carbonate, lithium carbonate, sodium tetraborate, lithium tetraborate, potassium metaborate, lithium sulfate and lithium hydroxide particularly advantageously improve the moisture resistance of the casting mold, when the water glass is used as the water-soluble inorganic binder. Specifically, the carbonates and the borates, which permit an improvement of the moisture resistance particularly easily, are preferably used. Any one or a mixture of the moisture-resistance improving agents including the above-mentioned ones may be used in the invention. It is noted that the above-mentioned moisture-resistance improving agents include the compounds which can be used as the water-soluble inorganic binder. Such compounds can exhibit the effect as the moisture-resistance improving agent when the water-soluble inorganic binder is a compound other than themselves.

The moisture-resistance improving agent is used generally in an amount of 0.5-50 parts by mass, preferably 1-20 parts by mass, and more preferably 2-15 parts by mass in total, per 100 parts by mass of the solid content of the water-soluble inorganic binder in the liquid state. It is preferred to use the moisture-resistance improving agent in an amount of not less than 0.5 part by mass to enjoy its advantageous effect. On the other hand, an excessively large amount of moisture-resistance improving agent inhibits the bonding effect of the water-soluble inorganic binder, resulting in deterioration of the strength of the finally-obtained casting mold. Thus, the amount of addition is preferred to be not more than 50 parts by mass.

The coated sand according to the invention may contain a suitable surfactant. The surfactant permits an improvement of permeability of water, that is, wettability to water of the coated sand. More specifically described, in the case of the coated sand in the dry state including the surfactant according to the invention, when water is supplied to the coated sand, the surfactant comes to exist between the supplied water and the water-soluble inorganic binder, so that the entirety of the coated sand is sufficiently moisturized with a small amount of water, whereby 1) a time required for supplying water (a time for passing steam, for example, when water is supplied by the steam) to the coated sand can be minimized, and 2) the amount of supply of water to the forming mold (forming cavity) is kept small, so that the manufactured casting mold enjoys advantageous effects such as excellent releasability from the forming mold and high strength.

The surfactant is preferably contained in the coated sand according to the invention in an amount of 0.1-20.0 parts by mass, more preferably 0.5-15.0 parts by mass, and particularly preferably 0.75-12.5 parts by mass, per 100 parts by mass of the solid content of the water-soluble inorganic binder. Where the amount of the surfactant is too small, the above-mentioned effects may not be enjoyed advantageously. On the other hand, an excessively large amount of surfactant does not contribute to a further improvement of the effects corresponding to the increase of the amount, and is not desirable in view of cost-effectiveness. In the invention, any of cationic, anionic, ampholytic, nonionic, silicone-based and fluorocarbon-based surfactants can be used as the surfactant.

Specifically described, examples of the cationic surfactant include aliphatic amine salts, aliphatic quaternary ammonium salts, benzalkonium salts, benzethonium chloride, pyridinium salts and imidazolinium salts. Examples of the anionic surfactant include fatty acid soaps, N-acyl-N-methylglycine salt, N-acyl-N-methyl-β-alanine salt, N-acyl glutamic acid salt, alkyl ether carboxylate, acyl peptide, alkylsulfonate, alkylbenzene sulfonate, alkylnaphthalene sulfonate, dialkyl sulfosuccinate, alkyl sulfoacetate, α-olefin sulfonate, N-acylmethyltaurine, sulfated oils, higher alcohol sulfate, secondary higher alcohol sulfate, alkyl ether sulfate, secondary higher alcohol ethoxysulfate, polyoxyethylene alkylphenyl ether sulfate, monoglysulfate, fatty acid alkylolamide sulfate, alkyl ether phosphate and alkyl phosphate. Furthermore, examples of the ampholytic surfactant include carboxy betaine, sulfobetaine, aminocarboxylate and imidazolinium betaine. In addition, examples of the nonionic surfactant include polyoxyethylene alkyl ether, polyoxyethylene sec-alcohol ether, polyoxyethylene alkyl phenyl ether (for example, Emulgen 911), polyoxyethylene sterolether, polyoxyethylene lanolin derivatives, polyoxyethylene polyoxypropylene alkyl ether (for example, NEWPOL PE-62), polyoxyethylene glycerine fatty acid ester, polyoxyethylene castor oil, hydrogenated castor oil, polyoxyethylene sorbitan fatty acid ester, polyoxyethylene sorbitol fatty acid ester, polyethylene glycol fatty acid ester, fatty acid monoglyceride, polyglyceryl fatty acid ester, sorbitan fatty acid ester, propylene glycol fatty acid ester, sucrose fatty acid ester, fatty acid alkanolamide, polyoxyethylene fatty acid amide, polyoxyethylene alkylamine, alkylamine oxide, acetylene glycol and acetylene alcohol.

Among various surfactants, one having a siloxane structure as a nonpolar portion is called the silicone-based surfactant, and one having a perfluoroalkyl group is called the fluorocarbon-based surfactant. Examples of the silicone-based surfactant include: polyester-modified silicone; silicone modified by polyester having an acrylic group at an end; polyether-modified silicone; silicone modified by polyether having an acrylic group at an end; polyglycerine-modified silicone; and aminopropyl-modified silicone. Examples of the fluorocarbon-based surfactant include perfluoroalkyl sulfonate, perfluoroalkyl carbonate, perfluoroalkyl phosphate, perfluoroalkyl trimethylammonium salt, perfluoroalkyl ethylene oxide adduct and an oligomer containing a perfluoroalkyl group.

Any one or a mixture of the above-mentioned various surfactants may be used in the invention. However, some of the surfactants react with the water-soluble inorganic binder, and may suffer from deterioration or a loss of the surface-activating ability as the time passes. For this reason, where the water glass is used as the water-soluble inorganic binder, for example, the anionic surfactant, the nonionic surfactant and the silicone-based surfactant, which do not react with the water glass, are advantageously used.

The coated sand according to the invention may further contain at least one nitrate selected from the group consisting of alkali metal salts and alkaline earth metal salts of nitric acid for improving the collapsibility of the casting mold. The nitrate is added to and mixed with the refractory aggregate along with the above-mentioned water-soluble inorganic binder and the spherical particles of silicone resin. The amount of the nitrate is preferably 0.5-30 parts by mass, more preferably 1-25 parts by mass, and particularly preferably 3-20 parts by mass, per 100 parts by mass of the solid content of the water-soluble inorganic binder in the coated sand. Where the amount of the nitrate is too small, the above-mentioned effects may not be enjoyed advantageously. On the other hand, an excessively large amount of nitrate does not contribute to a further improvement of the effects corresponding to the increase of the amount, and is not desirable in view of cost-effectiveness. Among the nitrates, sodium nitrate and potassium nitrate, which are the alkali metal nitrates, and calcium nitrate and magnesium nitrate, which are the alkaline earth metal nitrates, are preferred, and any one or a mixture of the above-mentioned kinds of nitrate can be used. Specifically, where the water-soluble inorganic binder is the water glass, sodium nitrate and potassium nitrate are advantageously used in view of their high solubility to the water glass.

The coated sand according to the invention may contain a moisturizer. The moisturizer permits, at the time of forming the casting mold, stable retention of moisture of the moisturized coated sand wetted by water, until the coated sand is solidified or cured by heating. The amount of the moisturizer in the invention is preferably 0.1-20.0 parts by mass, and more preferably 0.5-15.0 parts by mass, per 100 parts by mass of the solid content of the water-soluble inorganic binder. Examples of the moisturizer include polyhydric alcohols, water-soluble polymers, hydrocarbons, saccharides, proteins and inorganic compounds.

Specific examples of the polyhydric alcohol include ethylene glycol, diethylene glycol, triethylene glycol, polyethylene glycol, polypropylene glycol, dipropylene glycol, propylene glycol, butylene glycol, 1,2-butanediol, 1,2-pentanediol, 1,5-pentanediol, 1,2-hexanediol, 2-ethyl-1,3-hexanediol, 1,6-hexanediol, 1,2-heptanediol, 1,2-octanediol, 1,2,6-hexanetriol, thioglycol, hexylene glycol, glycerine, trimethylolethane and trimethylolpropane. The water-soluble polymeric compound specifically indicates a compound containing 5-25 alcoholic hydroxyl groups per molecular weight of 1000. Examples of the water-soluble polymeric compound include vinyl alcohol-based polymers such as polyvinyl alcohol and various modified products thereof; cellulose derivatives such as alkyl cellulose, hydroxylalkyl cellulose, alkylhydroxyalkyl cellulose, carboxymethyl cellulose, hydroxyethyl cellulose and hydroxypropyl methyl cellulose; starch derivatives such as alkyl starch, carboxymethyl starch and oxidized starch; and water-absorptive polymers such as sodium polyacrylate. Examples of the hydrocarbon include aliphatic hydrocarbon, alicyclic hydrocarbon, aromatic hydrocarbon, petroleum ether, petroleum benzyl, tetralin, decalin, tertiary amyl benzene, dimethylnaphthalene. Examples of the saccharide include monosaccharides, oligosaccharides and polysaccharides such as dextrin. Among them, the monosaccharide is a saccharide which cannot be decomposed into a simpler saccharide by hydrolysis. A monosaccharide used here is preferably triose (a saccharide having three carbon atoms) through decose (a saccharide having 10 carbon atoms), and more preferably hexose (a saccharide having six carbon atoms). The protein include gelatin. In addition, examples of the inorganic compound include saline, sodium sulfate, calcium chloride, magnesium chloride and silicate. Any one or a mixture of the above-indicated kinds of moisturizer may be used in the invention.

The coated sand according to the invention may contain particles of an inorganic metal oxide such as silicon dioxide, aluminum oxide and titanium oxide, having an average particle diameter of 0.1-20 μm. The particles of an inorganic metal oxide contained in the coated sand contribute to a more effective improvement of the fillability of the coated sand in the forming mold (forming cavity) at the time of forming the casting mold. The particles are contained in the coated sand preferably in an amount of 0.1-50.0 parts by mass, and more preferably 0.5-30.0 parts by mass, per 100 parts by mass of the solid content of the water-soluble inorganic binder. The average particle diameter of the particles is calculated from a particle size distribution measured with a laser diffraction-type particle counter, for example.

The particles of an inorganic metal oxide used in the invention are preferably spherical, and are not necessarily required to be in the form of a true sphere. Generally, the particles having a sphericity of not less than 0.5, preferably not less than 0.7, and more preferably not less than 0.9 are advantageously used. Here, the sphericity is defined by a mean value of aspect ratios calculated from projected shapes of 10 mutually independent particles arbitrarily selected for observation with a scanning electron microscope. The aspect ratio indicates a ratio of the short diameter to the long diameter.

The coated sand according to the invention may suitably contain various other known additives as necessary. For adding such additives to the coated sand, one method to be employed is adding a given additive in advance to the water-soluble inorganic binder in the liquid state, and kneading or mixing the binder containing the additive with the refractory aggregate. Another method is adding a given additive to the refractory aggregate independently of the water-soluble inorganic binder, and uniformly kneading or mixing the entirety of the additive, the binder and the refractory aggregate.

Specifically described, it is effective to use, as one of the above-mentioned other additives, a coupling agent which strengthens a bond between the refractory aggregate and the water-soluble inorganic binder. Examples of the coupling agent include silane coupling agents, zirconate coupling agents and titanate coupling agents. Also, it is effective to use a lubricant which serves to improve the fluidity of the coated sand. Examples of the lubricant include: waxes such as paraffin wax, synthetic polyethylene wax and montan wax; fatty acid amides such as stearic acid amide, oleic acid amide and erucic acid amide; alkylene fatty acid amides such as methylene-bis-stearic acid amide and ethylene-bis-stearic acid amide; stearic acid; stearyl alcohol; metal stearates such as lead stearate, zinc stearate, calcium stearate and magnesium stearate; glyceryl monostearate; stearyl stearate; and hydrogenated oils. Furthermore, it is possible to use a mold release agent such as paraffins, waxes, light oils, machine oils, spindle oils, insulating oils, waste oils, plant oils, fatty acid esters, organic acids, graphite particulates, mica, vermiculite, fluorine-based mold release agents, and silicone-based mold release agents like silicone oil. Each of the above-indicated additives is generally contained in the coated sand in an amount of not more than 5% by mass, and more preferably not more than 3% by mass, with respect to the solid content of the water-soluble inorganic binder.

In the invention, the coated sand in the dry state having fluidity at room temperature is produced according to the following method in general: initially, the water-soluble inorganic binder in the state of an aqueous solution as the binder, the spherical particles of silicone resin having binder-repellency, and other additives used as necessary, are uniformly kneaded or mixed with the refractory aggregate, so as to form a mixture in which the surface of the refractory aggregate is uniformly coated with the water-soluble inorganic binder. Subsequently, the water contained in the mixture is evaporated, whereby the intended powdery coated sand in the dry state (dry mold material) having fluidity at room temperature is obtained. The spherical particles of silicone resin are allowed to move to the surface of the coating layer of the water-soluble inorganic binder (binder layer) because of their binder-repellency, and come to be present on the surface of the binder layer, with a part of the spherical particles not being covered with the water-soluble inorganic binder and being exposed. In the above-mentioned method, the evaporation of the water in the mixture is required to be performed rapidly before the solidification or curing of the water-soluble inorganic binder progresses. For this reason, it is desirable to evaporate the water within 5 minutes, preferably 3 minutes, after the addition (mixing) of the water-soluble inorganic binder in the state of an aqueous solution to the refractory aggregate, to thereby obtain the coated sand in the dry state. Where the period of evaporation is excessively long, a cycle of mixing (kneading) is elongated so that productivity of the coated sand is deteriorated, and also there is a problem that the water-soluble inorganic binder is exposed to $CO_2$ in the air too long, thereby giving rise to a risk of deactivation of the water glass. The coated sand in the dry state obtained as described above is controlled to have a water content in a range of 5-55% by mass, preferably 10-50% by mass, and more preferably 20-50% by mass with respect to the solid content of the water glass, in the case where the water glass is used as the water-soluble inorganic binder, for example.

As an effective means for rapidly evaporating the water in the mixture, the above-mentioned method of producing the coated sand in the dry state (mold material) includes steps of: preheating the refractory aggregate; adding the water-soluble inorganic binder in the state of an aqueous solution and the spherical particles of silicone resin to the preheated refractory aggregate; and kneading or mixing the refractory aggregate containing the binder and other components so as to obtain a mixture. By kneading or mixing the water-soluble inorganic binder in the state of an aqueous solution, together with the spherical particles and other components, with the preheated refractory aggregate, the water derived from the water-soluble inorganic binder in the state of an aqueous solution can be extremely rapidly evaporated by the heat of the refractory aggregate, whereby the water content of the mold material to be obtained is effectively reduced, so that the coated sand in the dry state having fluidity at room temperature is advantageously obtained. A temperature to which the refractory aggregate is preheated is adequately selected depending on the kind and the amount of use of the water-soluble inorganic binder, and the water content in the aqueous solution of the water-soluble inorganic binder, for example. In general, it is desirable to preheat the refractory aggregate to a temperature of about 100-160° C., and preferably about 100-140° C., when the water glass is used as the binder. Where the preheating temperature of the refractory aggregate is undesirably low, the water cannot be effectively evaporated, so that a time required for drying the mixture is undesirably increased. Therefore, it is desirable to preheat the refractory aggregate to a temperature of not lower than 100° C. On the other hand, where the refractory aggregate is preheated to an excessively high temperature, solidification (curing) of the components of the water-soluble inorganic binder proceeds while the coated sand (mold material) to be obtained is cooled, thereby promoting the formation of the complex of the particles. As a result, the coated sand comes to suffer from problems in terms of its function, particularly in the strength or other physical properties.

In the production of the coated sand in the dry state according to the invention, the spherical particles of silicone resin having binder-repellency are added to and mixed with the predetermined refractory aggregate, together with the water-soluble inorganic binder in the liquid state, and allowed to move to the surface of the layer of the water-soluble inorganic binder (binder layer) formed on the surface of the refractory aggregate because of their binder-repellency. More specifically described, the spherical particles of silicone resin having binder-repellency may be added to and kneaded or mixed with the refractory aggregate simultaneously with the water-soluble inorganic binder in the liquid state, or before the binder is added to the refractory aggregate; the spherical particles of silicone resin having binder-repellency and the water-soluble inorganic binder in the liquid state are mixed with each other in advance, and then added to and kneaded with the refractory aggregate; or the spherical particles of silicone resin are added to the refractory aggregate, with a predetermined time lag, after mixing the water-soluble inorganic binder in the liquid state with the refractory aggregate. At the time of the above-mentioned kneading or mixing, the spherical particles of silicone resin having binder-repellency fluidly move to the surface of the water-soluble inorganic binder in the liquid state. For this reason, when producing the coated sand in the dry state, a binder layer in the solid state consisting of the water-soluble inorganic binder is formed so as to coat the surface of the refractory aggregate, and the spherical particles of silicone resin are allowed to be present on the surface of the binder layer by adhering thereto, or forming a layer thereon.

Among the above-mentioned methods of kneading or mixing the spherical particles of silicone resin and the water-soluble inorganic binder in the liquid state with the refractory aggregate, the method in which the spherical particles of silicone resin having binder-repellency are added to the refractory aggregate after addition of the water-soluble inorganic binder in the liquid state to the refractory aggregate, with a predetermined time lag, permits surer distribution of the spherical particles on the surface of the binder layer. Meanwhile, when the water-soluble inorganic binder is added to the refractory aggregate, a load to a motor of a mixer used for kneading or mixing the binder and the refractory aggregate increases, and after reaching the peak, the load declines. For this reason, in the case where the spherical particles are added to the refractory aggregate after the addition of the water-soluble inorganic binder, the spherical particles are added preferably at the time when the load to the motor reaches the peak, or at a time between the above-mentioned peak and the time when the load to the motor reaches the bottom.

When kneading or mixing of the water-soluble inorganic binder in the liquid state with the heated refractory aggregate starts, the water contained in the water-soluble inorganic binder is gradually evaporated, so that viscosity of the water-soluble inorganic binder is increased. Consequently, the load to the motor of the mixer increases, then reaches the peak at a certain time. After the peak, the water is further evaporated to thereby form the coated sand in the dry state, so that the load to the motor declines. This means that the peak of the load to the motor is also the peak of the viscosity of the water-soluble inorganic binder. Thus, where the spherical particles of silicone resin are added to the mixer after this timing, the spherical particles effectively come to exist on the surface of the binder layer, or form a layer on the surface of the binder layer. When the load of the motor reaches the bottom, the binder turns to be in the dry state, that is, in the solid or hard state, and loses the viscosity, resulting in a possibility that the spherical particles to be added fall out of the surface. For this reason, it is preferred to add the spherical particles before the load of the motor reaches the bottom. In actual kneading operation, the spherical particles can be added about 5 seconds before the peak, but preferably added after the peak. By adding the spherical particles of silicone resin with the above-mentioned time lag in terms of the addition of the water-soluble inorganic binder, in the invention, the spherical particles are uniformly dispersed over the surface of the binder layer with ease. Furthermore, since the spherical particles are allowed to be present near the surface of the coating layer of the coated sand to be obtained, the casting mold obtained by using the coated sand exhibits better fillability.

In producing the coated sand in the dry state according to the invention by employing the above-mentioned method, the water-soluble inorganic binder in the state of an aqueous solution which is used as the binder is dissolved in water in advance of its use in the case where the water-soluble inorganic binder is a solid. In the case where the water-soluble inorganic binder is in the liquid state, a commercially available liquid is used as purchased, or as a diluted solution obtained by further adding water to the liquid for adjusting its viscosity. Furthermore, it is possible to add the water-soluble inorganic binder in the solid state or the liquid state and water independently with each other, at the time of their kneading or mixing with the refractory aggregate.

Meanwhile, the following two methods are examples of a method of manufacturing a casting mold by employing the coated sand (mold material) in the dry state having fluidity at room temperature according to the invention. In the first method, the coated sand in the dry state is kneaded with water in a mold-forming site, which is a place for manufacturing casting molds, so that the coated sand is moisturized. The moisturized coated sand is filled or packed in a forming cavity of a forming mold for forming an intended casting mold, while the forming mold is heated to a temperature of 80-300° C., preferably 90-250° C., and more preferably 100-200° C., and held at this temperature until the filled coated sand is dried in the forming mold. In the second method, steam is blown into and passed through a forming cavity of a forming mold for forming an intended casting mold after the coated sand in the dry state is filled in the forming cavity, so that the steam is passed through the filled or packed phase of the coated sand. By passing of the steam, the coated sand in the dry state is supplied with water and moisturized, and the moisturized coated sand is held within the forming mold heated to a temperature of 80-300° C., preferably 90-250° C., and more preferably 100-200° C., until the coated sand is dried. It is noted that the water-soluble inorganic binder is usually solidified due to its water evaporation to dryness when no additive is contained, or is cured when an oxide or a salt is contained as a curing agent. In the present invention, a mass (united body) of the coated sand includes both of a mere solidified product and a cured product which has been cured with a curing agent. In addition, it is to be understood that the description "solidified product" in the present description includes also the meaning of "cured product".

When kneading (mixing) the coated sand (mold material) in the dry state and water in the above-mentioned first method, the coated sand in the dry state is transferred to a mold-forming site as a place for manufacturing casting molds, and moisturized by addition of water at the mold-forming site. Then, the moisturized coated sand is filled in the forming mold, to form a desired casting mold. In the above-mentioned process, the step of moisturizing the coated sand in the dry state by addition of water is performed simply by charging the coated sand in the dry state and a predetermined amount of water into a suitable mixer, and mixing them, to thereby wet the coated sand. The step is a remarkably simple operation, and has an advantage that the step is quite simply and easily performed even in the mold-forming site, whose working environment is not good. When adding water, at least one selected from other additives, a curing accelerator, and a water-soluble inorganic binder for readjusting mold strength may also be added as necessary. As water, any aqueous medium containing water can be used.

In the above-mentioned second method, the temperature at which the steam is blown into the coated sand filled in the forming mold (filled phase) is generally around 80-150° C., more preferably 95-120° C. Steam of a relatively high temperature requires a large amount of energy for its production, so that the temperature of the steam is preferred to be around 100° C. in particular. The pressure at which the steam is passed through according to the invention is generally around 0.01-0.3 MPa, more preferably 0.01-0.1 MPa, in terms of gauge pressure. In general, the length of time for passing steam is from about 2 seconds up to about 60 seconds. An excessively short period of time makes it difficult to sufficiently moisturize the surface of the coated sand in the dry state, while an excessively long period of time causes dissolution and flow-out of the water-soluble inorganic binder forming the coating layer on the surface of the coated sand (mold material).

Furthermore, in the first and second methods described above, heated air or superheated steam is blown into and passed through the wet coated sand in the filled phase to expedite drying of the filled phase. Passing of the heated air or the superheated steam (heated air or the like) permits quick drying of even an inner portion of the coated sand in the filled phase, so as to promote solidification or curing of the filled phase more advantageously, and increase the curing rate advantageously, thereby contributing to an effective improvement of flexural strength and other properties of the casting mold to be obtained, and reduction of the time required for forming the casting mold. To further advantageously promote solidification or curing of the filled phase, carbon dioxide ($CO_2$ gas), esters and the like as a curing accelerator may be passed in the form of gas or mist, for example before passing of the heated air or the like in the case of the first method, and between passing of the steam and passing of the heated air or the like in the case of the second method. The carbon dioxide and the esters neutralize the water-soluble inorganic binder to further promote solidification or curing of the water-soluble inorganic binder. Passing of the carbon dioxide and the esters may be performed at the same time as passing of the heated air or the like in the first method, or at the same time as passing of the steam or passing of the heated air or the like in the second method.

Examples of the curing accelerator described above include carbon dioxide and various esters such as methyl formate, ethyl formate, propyl formate, γ-butyrolactone, β-propiolactone, ethyleneglycol diacetate, diethyleneglycol diacetate, glycerin diacetate, triacetin and propylenecarbonate. Any one or a mixture of the above-indicated curing accelerator may be used in the invention.

When manufacturing an intended casting mold by using the coated sand according to the invention, various known molding methods can be employed in addition to the above-mentioned methods. One example of the methods is a multilayer molding operation, in which a three-dimensional casting mold is directly formed by successively superposing a plurality of layers of the coated sand on each other, and curing a portion of the layers corresponding to the shape of an intended casting mold.

EXAMPLES

To clarify the present invention more specifically, some examples and comparative examples of the present invention will be described. However, it is to be understood that the present invention is by no means limited by the details of the illustrated examples and comparative examples. In the examples and comparative examples described below, "%" and "part" respectively indicate "% by mass" and "part by mass", unless otherwise specified. Measurements and evaluations are performed as follows, with respect to properties of resin particles and binders used in the examples and comparative examples, properties of the obtained coated sands (mold materials): CSs, and various properties recognized in a molding test and a casting test with respect to each of the CSs.

(1) Measurement of an Average Particle Diameter

The average particle diameter of the particles used in the Examples and Comparative Examples is measured with a Microtrac particle size distribution analyzer manufactured by Nikkiso Co., Ltd., JAPAN (Trade name: MT3200II), such that a value of the particle diameter at 50% in the cumulative distribution of the particle size is regarded as the average particle diameter ($D_{50}$).

(2) Measurement of a Weight Reduction Ratio of Resin Particles by Thermo-Gravimetry (TG)

A sample of the resin particles accommodated in a platinum cell is heated from the room temperature to 930° C. by using a differential thermogravimetric analyzer (TG-DTA Thermoplus2 TG8120 manufactured by Rigaku Corporation, JAPAN; air flow rate: 500 ml/min, temperature rising rate: 10° C./min, and platinum cell with a diameter of 0.5 cm×a height of 0.5 cm). The sample is measured of its weight reduction ratio during the temperature rising from the room temperature to 700° C.

(3) Measurement of a Contact Angle

A level of the resin particles in a glass Petri dish is provided to form a horizontal plane, and a drop of a liquid of each water-soluble inorganic binder used for producing a coated sand is dripped on the horizontal plane by means of a syringe. The drop formed of the dripped water-soluble inorganic binder is observed with a digital microscope BS-D800011 manufactured by Sonic Co., Ltd. (JAPAN), whereby the contact angle between the horizontal plane formed of the resin particles and the drop formed of the dripped water-soluble inorganic binder is measured. In the case where the water-soluble inorganic binder permeates into the resin particles and does not form a drop, the contact angle cannot be measured, thereby indicating that the resin particles do not have binder-repellency.

(4) Measurement of a Water Content of the CS

The method for measuring the water content of the CS is not limited, and one example is indicated below. First, 10 g of each CS is weighed and accommodated in a crucible subjected to dummy heating and weighing, and a sum of the water content, a content of thermally-decomposed resin particles and a content of organic components in the CS [hereinafter, represented as "(water+decomposed resin particles+organic components) content", and called "W1"] is calculated according to the following formula (1), by using the amount (%) of reduction of mass after subjecting the CS in the crucible to heating for 1 hour at 900° C. The content of the thermally-decomposed resin particles indicates the amount of weight reduction due to decomposition of the resin particles, and the content of the organic components indicates an amount of organic additives (hereinafter, referred to as the organic components). It is noted that the weight is measured to the fourth decimal place. Subsequently, a solid content (B1) of the water-soluble inorganic binder with respect to the CS is calculated according to the following formula (2). Then, the water content with respect to the solid content of the water-soluble inorganic binder (the water content W2 of the CS with respect to the solid content of the water-soluble inorganic binder in the coating layer) is calculated according to the following formula (3) on the basis of the (water+decomposed resin particles+organic components) content (W1) in the CS, the solid content (B1) of the water-soluble inorganic binder with respect to the CS, an amount of addition (A) of the resin particles per 100 parts of the solid content of the water-soluble inorganic binder, a weight reduction ratio (C) due to decomposition of the resin particles, which ratio (C) is measured according to a method described later, an amount of addition (D) of the organic components per 100 parts of the solid content of the water-soluble inorganic binder, and the ratio (E) of the solid content of the organic components, which content (E) is required where the CS is in the dry state, and measured according to a method described later. W2 calculated as described above is indicated as "water content (% by mass)" in the following Tables 1 and 2.

$$W1=[(M1-M2)/M3]\times 100-W1) \quad (1)$$

[W1: (water+decomposed resin particles+organic components) content (%) in the CS, M1: total mass (g) of the crucible and the CS before baking, M2: total mass (g) of the crucible and the CS after baking, and M3: mass (g) of the CS before baking]

$$B1=[B2/(100+B2)]\times(100\times W1) \quad (2)$$

[B1: solid content (%) of the water-soluble inorganic binder with respect to the CS, B2: solid content (parts) of the water-soluble inorganic binder which is added to 100 parts of the sand, and W1: (water+decomposed resin particles+organic components) content (%) in the CS]

$$W2=[(W1/B1)\times 100]\times[(A\times C)/100]-[(D\times E)/100] \quad (3)$$

[W2: water content (%) of the CS with respect to the solid content of the water-soluble inorganic binder in the coating layer, W1: (water+organic components) content (%) in the CS, B1: solid content (%) of the water-soluble inorganic binder with respect to the CS, A: amount of addition (parts) of the resin particles per 100 parts of the solid content of the water-soluble inorganic binder, C: weight reduction ratio (%) due to decomposition of the resin particles, D: amount of addition (parts) of the organic components per 100 parts of the solid content of the water-soluble inorganic binder, and E: ratio (%) of the solid content of the organic components in the CS]

(5) Measurement of a Filling Rate

A casting mold having a width of 1.0 cm, a height of 1.0 cm and a length of 8.0 cm (in the case where steam is passed through, one having a width of 2.54 cm, a height of 2.54 cm and a length of 20 cm) is obtained in each of the Examples and the Comparative Examples, and the obtained casting mold is used as a sample. A ratio of the specific gravity of the casting mold to the true specific gravity of the aggregate is calculated as a percentage. The specific gravity of the sample is obtained by dividing the mass of the sample with the volume of the sample.

Filling rate (% by mass)={[mass (g) of the sample/volume (cm$^3$) of the sample]/true specific gravity (g/cm$^3$) of the aggregate}×100

(6) Evaluation of a State of Sand Adhesion After Casting Process

Figure 2:
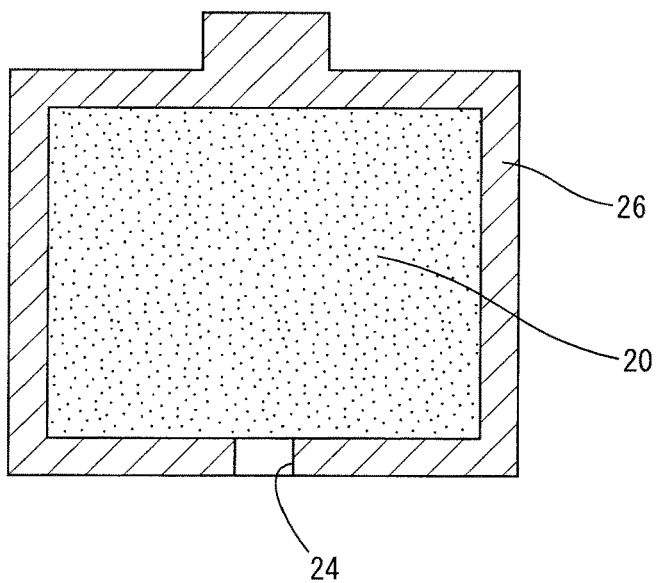
FIG. 2 is a schematic longitudinal view showing an aluminum alloy cast product obtained in the Examples, which contains waste core sand.

Initially, as shown in FIG. 1, a half-split hollow main mold 16 (diameter of cavity: 6 cm; height: 6 cm) is formed from a normal temperature self-curing sand in advance, such that the main mold 16 has a molten metal inlet 12 in its upper part, and a baseboard fixing portion 14 in its lower part. Then, a circular non-hollow core 20 (diameter: 5 cm; height: 5 cm) having a baseboard 18, which circular non-hollow 20 core is produced by using each CS, is accommodated in the half-split hollow main mold 16. The baseboard 18 is joined and fixed with the baseboard fixing portion 14, and two pieces of the half-split main mold 16 are joined and fixed with each other, whereby a sand mold 22 for casting test is manufactured. To prevent leakage of molten metal during casting, the joined main mold 16 is cramped in a vise, or wound by a wire to be firmly fixed. Next, molten metal of an aluminum alloy (temperature: 710±5° C.) is poured to the sand mold 22 for casting test through the molten metal inlet 12. After the molten metal is solidified, the main mold 16 is broken, so as to take out a cylindrical cast product 26 shown in FIG. 2. The cast product 26 is cooled to the room temperature, and cut to the half with a lathe or the like, together with the core accommodated in its inside. Then the core is removed, and the state of adhesion of the core sand (CS) to the cast product is visually observed, and evaluated according to the following standard. The examples evaluated as Average or Good according to the following standard are considered to meet the requirement of the invention.

Good: No sand adhesion recognized

Average: Sand adhesion recognized only in a part of the surface of the cast product Poor: Sand adhesion recognized over the entirety of the surface of the cast product (7) Evaluation of Surface Roughness of the Cast Product Each of the cast products evaluated with respect to the state of sand adhesion in the above-mentioned (6) Evaluation of a state of sand adhesion after casting process is evaluated according to the following standard on the surface roughness, which is visually observed and felt by the finger. In the case where the sand (CS) adheres to the surface of the cast product, the surface of the cast product is evaluated after removing the adhered sand (CS) by a brass brush and the like. The examples evaluated as Average or Good according to the following standard are considered to meet the requirement of the invention.

Good: No roughness visually observed, and no stuck felt on fingertip

Average: Some roughness visually observed, but no stuck felt on fingertip

Poor: Remarkable roughness visually observed, and some stuck felt on fingertip (8) Measurement of Flexural Strength of a Casting Mold, and a Strength Retention Ratio Upon Moisture Absorption of the Casting Mold The sample obtained in the above-mentioned (5) Measurement of a filling rate by using each of the CSs is measured of its breaking load with a measuring device (a digital molding sand strength tester available from Takachiho Seiki Co., Ltd., JAPAN). Flexural strength is calculated from the measured breaking load according to the following formula. It is noted that the breaking load is measured with respect to the sample of the room temperature after 1 hour from its formation.

Flexural strength $(N/cm^2)=1.5\times LW/ab^2$

[L: length (cm) of a support span, W: breaking load (N), a: width (cm) of the sample, b: thickness (cm) of the sample]

Subsequently, a mixed solution of water and glycerol and a metal mesh with four legs are accommodated in a container, and the sample is placed on the metal mesh not to be in touch with the mixed solution of water and glycerol having 20% of glycerol concentration. The container accommodating the sample is put and held in a thermostat at a moisture percentage of 80% and a temperature of 40° C. for 24 hours, such that the sample is subjected to deterioration due to moisture absorption. With respect to the sample after being subjected to moisture absorption, its flexural strength is measured as described above. The strength retention ratio upon moisture absorption is calculated according to the following formula using values of the flexural strength before and after moisture absorption.

Strength retention ratio (%) upon moisture absorption=(flexural strength after moisture absorption/flexural strength before moisture absorption)×100

(9) Measurement of an Amount of Gas Generation

The amount of gas generation is measured with a PGD-type gas pressure measuring device (manufactured by GEORG FISCHER LTD.) as follows, at a temperature of 700° C. First, the temperature in the furnace is raised to 700° C. 1 g of a test piece shaved off from the sample obtained by using each CS in the above-mentioned (5) Measurement of a filling rate is charged in a cylindrical copper sample tube (diameter: about 0.7 cm, height: 7.7 cm). The sample tube is covered with a commercially available heat insulator Kaowool and is positioned at an end of the furnace, within which a nitrogen atmosphere is generated. Subsequently, the sample tube is put into the sealed furnace. The pressure of the generated gas is detected by a pressure sensor, and its values are recorded and collected as a data by utilizing a signal converter and the like, until the values of the pressure become constant, that is, until the gas generation terminates. The amount of gas generation is calculated from the obtained data of the pressure, by using a pressure-volume conversion calibration curve (calibration curve on the basis of decomposition of potassium bicarbonate).

Amount of gas generation (ml/g)=Amount of gas generation in total (ml)/Mass of the sample (g)

Production Case of CS1 in the Dry State

A spherical artificial molding sand LUNAMOS #60 (Trade Name; commercially available from Kao-Quaker Co., Ltd., JAPAN, AFS: 65.1) was provided as a refractory aggregate, and sodium silicate No. 2 (the molar ratio $SiO_2/Na_2O$ is 2.5 and the solid content is 41.3%) was provided as a water glass which is a water-soluble inorganic binder.

100 parts of the above-mentioned aggregate (LUNAMOS #60) was heated to a temperature of about 150° C., and charged into a whirl mixer (available from Enshu Tekko Kabushiki Kaisha, JAPAN). Furthermore, the water glass and spherical resin particles (average particle diameter: 2.0 μm) of polymethylsilsesquioxane as spherical particles of silicone resin having binder-repellency were fed into the mixer, in an amount of 1.1 parts (solid content: 0.45 part) and in an amount of 0.05 part respectively, per 100 parts of the aggregate (LUNAMOS #60). The contents in the mixer were kneaded for 1 minute to thereby evaporate the water contained in the water glass, and stirred and mixed to the extent that an agglomerate of the sand particles collapsed. Then, the formed sand particles were taken out of the whirl mixer, whereby a coated sand (mold material): CS1 in the dry state having fluidity at room temperature was obtained. The obtained CS1 had a coating layer containing the water glass and the spherical particles of silicone resin formed on the surface of the aggregate, a part of the spherical particles not being covered with the water glass and being exposed to the outside. The water content of the CS1 was equivalent to 34% by mass of the solid content of the water glass in the coating layer.

Production Case of CS2 in the Dry State

CS2 in the dry state was obtained by the same procedure as in the Production Case of CS1 in the dry state, except that the spherical particles of silicone resin were used in an amount of 0.10 part. The water content of the CS2 was equivalent to 35% by mass of the solid content of the water glass.

Production Case of CS3 in the Dry State

CS3 in the dry state was obtained by the same procedure as in the Production Case of CS1 in the dry state, except that the spherical particles of silicone resin were used in an amount of 0.25 part. The water content of the CS3 was equivalent to 34% by mass of the solid content of the water glass.

Production Case of CS4 in the Dry State

CS4 in the dry state was obtained by the same procedure as in the Production Case of CS1 in the dry state, except that the spherical particles of silicone resin were used in an amount of 1.00 part. The water content of the CS4 was equivalent to 35% by mass of the solid content of the water glass.

Production Case of CS5 in the Dry State

CS5 in the dry state was obtained by the same procedure as in the Production Case of CS3 in the dry state, except that spherical resin particles of polymethylsilsesquioxane having an average particle diameter of 0.7 μm were used as the spherical particles of silicone resin having binder-repellency. The water content of the CS5 was equivalent to 34% by mass of the solid content of the water glass.

Production Case of CS6 in the Dry State

CS6 in the dry state was obtained by the same procedure as in the Production Case of CS3 in the dry state, except that spherical resin particles of polymethylsilsesquioxane having an average particle diameter of 5.0 μm were used as the spherical particles of silicone resin having binder-repellency. The water content of the CS6 was equivalent to 35% by mass of the solid content of the water glass.

Production Case of CS7 in the Dry State

CS7 in the dry state was obtained by the same procedure as in the Production Case of CS3 in the dry state, except that spherical resin particles of polymethylsilsesquioxane having an average particle diameter of 30 μm were used as the spherical particles of silicone resin having binder-repellency. The water content of the CS7 was equivalent to 35% by mass of the solid content of the water glass.

Production Case of CS8 in the Dry State

CS8 in the dry state was obtained by the same procedure as in the Production Case of CS3 in the dry state, except that polymethylsilsesquioxane-coated spherical resin particles (average particle diameter: 5.0 μm), which were formed by covering surfaces of resin particles of cross-linked dimethylpolysiloxane (core material) with polymethylsilsesquioxane as a shell material, were used as the spherical particles of silicone resin. The water content of the CS8 was equivalent to 35% by mass of the solid content of the water glass.

Production Case of CS9 in the Dry State

CS9 in the dry state was obtained by the same procedure as in the Production Case of CS3 in the dry state, except that an aqueous solution (solid content: 20% by mass) of sodium chloride was provided as the water-soluble inorganic binder, and added to the aggregate in an amount of 3.3 parts (solid content: 0.66 part) per 100 parts of the aggregate. The water content of the CS9 was equivalent to 3% by mass of the solid content of the sodium chloride.

Production Case of CS10 in the Dry State

CS10 in the dry state was obtained by the same procedure as in the Production Case of CS3 in the dry state, except that an aqueous solution (solid content: 20% by mass) of sodium sulfate was provided as the water-soluble inorganic binder, and added to the aggregate in an amount of 3.3 parts (solid content: 0.66 part) per 100 parts of the aggregate. The water content of the CS10 was equivalent to 4% by mass of the solid content of the sodium sulfate.

Production Case of CS11 in the Dry State

CS11 in the dry state was obtained by the same procedure as in the Production Case of CS1 in the dry state, except that the spherical particles of silicone resin were not used. The water content of the CS11 was equivalent to 33% by mass of the solid content of the water glass.

Production Case of CS12 in the Dry State

CS12 in the dry state was obtained by the same procedure as in the Production Case of CS3 in the dry state, except that spherical resin particles (average particle diameter: 5.0 μm) formed of cross-linked dimethylpolysiloxane not having binder-repellency were used as the spherical particles of silicone resin. The water content of the CS12 was equivalent to 38% by mass of the solid content of the water glass.

Production Case of CS13 in the Dry State

CS13 in the dry state was obtained by the same procedure as in the Production Case of CS3 in the dry state, except that resin particles (average particle diameter: 4.0 μm) of polymethylsilsesquioxane having irregular shapes were used in place of the spherical particles of silicone resin. The water content of the CS13 was equivalent to 36% by mass of the solid content of the water glass.

Production Case of CS14 in the Dry State

CS14 in the dry state was obtained by the same procedure as in the Production Case of CS3 in the dry state, except that resin particles (average particle diameter: 7.0 μm) of polytetrafluoroethylene having irregular shapes were used in place of the spherical particles of silicone resin. The water content of the CS14 was equivalent to 36% by mass of the solid content of the water glass.

Production Case of CS15 in the Dry State

CS15 in the dry state was obtained by the same procedure as in the Production Case of CS3 in the dry state, except that spherical resin particles (average particle diameter: 6.0 μm) of polyethylene were used in place of the spherical particles of silicone resin. The water content of the CS15 was equivalent to 37% by mass of the solid content of the water glass.

Production Case of CS16 in the Dry State

CS16 in the dry state was obtained by the same procedure as in the Production Case of CS3 in the dry state, except that resin particles (average particle diameter: 2.0 μm) of polyethylene having irregular shapes were used in place of the spherical particles of silicone resin. The water content of the CS16 was equivalent to 37% by mass of the solid content of the water glass.

Production Case of CS17 in the Dry State

CS17 in the dry state was obtained by the same procedure as in the Production Case of CS3 in the dry state, except that particles (average particle diameter: 3.0 μm) of ethylene-bis-stearic acid amide having irregular shapes were used in place of the spherical particles of silicone resin. The water content of the CS17 was equivalent to 35% by mass of the solid content of the water glass.

Production Case of CS18 in a Dry State

CS18 in the dry state was obtained by the same procedure as in the Production Case of CS3 in the dry state, except that particles (average particle diameter: 5.0 μm) of calcium stearate having a shape of scale were used in place of the spherical particles of silicone resin. The water content of the CS18 was equivalent to 36% by mass of the solid content of the water glass.

Production Case of CS19 in the Dry State

CS19 in the dry state was obtained by the same procedure as in the Production Case of CS11 in the dry state, except that an aqueous solution (solid content: 20% by mass) of sodium chloride was provided as the water-soluble inorganic binder, and added to the aggregate in an amount of 3.3 parts (solid content: 0.66 part) per 100 parts of the aggregate. The water content of the CS19 was equivalent to 2% by mass of the solid content of the sodium chloride.

Production Case of CS20 in the Dry State

CS20 in the dry state was obtained by the same procedure as in the Production Case of CS11 in the dry state, except that an aqueous solution (solid content: 20% by mass) of sodium sulfate was provided as the water-soluble inorganic binder, and added to the aggregate in an amount of 3.3 parts (solid content: 0.66 part) per 100 parts of the aggregate. The water content of the CS20 was equivalent to 3% by mass of the solid content of the sodium sulfate.

Formation Case|of Casting Molds (Examples 1-10 and Comparative Examples 1-10)

Each of the CS1-CS20 produced according to the above-mentioned procedure was charged into a Shinagawa-type universal stirrer (5DM-r type; available from Dalton Corporation, JAPAN) at the room temperature (temperature: 20° C.), and subsequently water was introduced into the stirrer in an amount of 1.0 part per 100 parts of the CS. The contents in the stirrer were stirred, so that a moisturized CS (mold material) was obtained. Next, the moisturized CS taken out of the stirrer was blown into a metal die heated to 150° C., at a gauge pressure of 0.3 MPa, and was thus filled in the metal die. The CS filled in the metal die was held within the metal die to be solidified or cured, whereby a sample (dimensions: 1.0 cm-1.0 cm-8.0 cm) for measuring a filling rate was obtained. The CSs which were used in the Examples 1-10 and the Comparative Examples 1-10 are shown in the following Tables 1 and 2.

The obtained sample for measuring a filling rate was measured of the filling rate according to the above-mentioned measuring method. Furthermore, an aluminum casting test was conducted with respect to the casting mold manufactured from each of the CSs to obtain a cast product, and the cast product was evaluated with respect to its state of sand adhesion after the casting test and the surface roughness, according to the above-mentioned methods. The results are shown in the following Tables 1 and 2, along with the average particle diameter, the contact angle and the TG weight reduction ratio of the resin particles and the water content of the coated sand.

TABLE 1

| Constitution of coated sand (CS) | | | Example 1 CS1 | Example 2 CS2 | Example 3 CS3 | Example 4 CS4 | Example 5 CS5 | Example 6 CS6 | Example 7 CS7 | Example 8 CS8 | Example 9 CS9 | Example 10 CS10 |
|---|---|---|---|---|---|---|---|---|---|---|---|---|
| Aggregate | | Kind | LUNAMOS #60 | LUNAMOS #60 | LUNAMOS #60 | LUNAMOS #60 | LUNAMOS #60 | LUNAMOS #60 | LUNAMOS #60 | LUNAMOS #60 | LUNAMOS #60 | LUNAMOS #60 |
| | | Amount (parts by mass) | 100 | 100 | 100 | 100 | 100 | 100 | 100 | 100 | 100 | 100 |
| | Water glass | Kind | No. 2 | No. 2 | No. 2 | No. 2 | No. 2 | No. 2 | No. 2 | No. 2 | — | — |
| | | Molar ratio | 2.5 | 2.5 | 2.5 | 2.5 | 2.5 | 2.5 | 2.5 | 2.5 | — | — |
| | | Amount (parts by mass) | 1.1 | 1.1 | 1.1 | 1.1 | 1.1 | 1.1 | 1.1 | 1.1 | — | — |
| | | Solid content (parts by mass) | 0.45 | 0.45 | 0.45 | 0.45 | 0.45 | 0.45 | 0.45 | 0.45 | — | — |
| | Sodium chloride | Amount (parts by mass) | — | — | — | — | — | — | — | — | 3.3 | — |
| | | Solid content (parts by mass) | — | — | — | — | — | — | — | — | 0.66 | — |
| | Sodium sulfate | Amount (parts by mass) | — | — | — | — | — | — | — | — | — | 3.3 |
| | | Solid content (parts by mass) | — | — | — | — | — | — | — | — | — | 0.66 |
| | Particles | Kind | Polymethyl silsesquioxane | Polymethyl silsesquioxane | Polymethyl silsesquioxane | Polymethyl silsesquioxane | Polymethyl silsesquioxane | Polymethyl silsesquioxane | Polymethyl silsesquioxane | Shell: Polymethyl silsesquioxane Core: Cross-linked dimethyl polysiloxane | Polymethyl silsesquioxane | Polymethyl silsesquioxane |
| | | Average particle diameter (μm) | 2.0 | 2.0 | 2.0 | 2.0 | 0.7 | 5.0 | 30 | 5.0 | 2.0 | 2.0 |
| | | Shape | Spherical | Spherical | Spherical | Spherical | Spherical | Spherical | Spherical | Spherical | Spherical | Spherical |
| | | TG weight reduction ratio (%) | 12 | 12 | 12 | 12 | 14 | 14 | 58 | 60 | 12 | 12 |
| | | Amount (parts by mass) | 0.05 | 0.10 | 0.25 | 1.00 | 0.25 | 0.25 | 0.25 | 0.25 | 0.25 | 0.25 |
| | | Contact angle (°) | 135 | 135 | 135 | 135 | 129 | 129 | 126 | 126 | 131 | 132 |
| | | Water content (% by mass) | 34 | 35 | 34 | 35 | 34 | 35 | 35 | 35 | 3 | 4 |
| Production method of casting mold | | | Addition of water | Addition of water | Addition of water | Addition of water | Addition of water | Addition of water | Addition of water | Addition of water | Addition of water | Addition of water |
| Sample (1 × 1 × 8 cm) | | Filling rate (% by mass) | 59.8 | 61.3 | 61.9 | 58.3 | 57.5 | 57.6 | 56.3 | 57.4 | 62.3 | 61.9 |
| Aluminum casting test | | State of sand adhesion after casting process | Good | Good | Good | Good | Good | Good | Good | Good | Good | Good |
| | | Surface roughness of cast product | Good | Good | Good | Good | Good | Good | Good | Average | Good | Good |

TABLE 2

| Constitution of coated sand (CS) | | | Comparative Example 1 CS11 | Comparative Example 2 CS12 | Comparative Example 3 CS13 | Comparative Example 4 CS14 | Comparative Example 5 CS15 | Comparative Example 6 CS16 | Comparative Example 7 CS17 | Comparative Example 8 CS18 | Comparative Example 9 CS19 | Comparative Example 10 CS20 |
|---|---|---|---|---|---|---|---|---|---|---|---|---|
| Aggregate | Kind | | LUNAMOS #60 | LUNAMOS #60 | LUNAMOS #60 | LUNAMOS #60 | LUNAMOS #60 | LUNAMOS #60 | LUNAMOS #60 | LUNAMOS #60 | LUNAMOS #60 | LUNAMOS #60 |
| | Amount (parts by mass) | | 100 | 100 | 100 | 100 | 100 | 100 | 100 | 100 | 100 | 100 |
| Water glass | Kind | | No. 2 | No. 2 | No. 2 | No. 2 | No. 2 | No. 2 | No. 2 | No. 2 | — | — |
| | Molar ratio | | 2.5 | 2.5 | 2.5 | 2.5 | 2.5 | 2.5 | 2.5 | 2.5 | — | — |
| | Amount (parts by mass) | | 1.1 | 1.1 | 1.1 | 1.1 | 1.1 | 1.1 | 1.1 | 1.1 | — | — |
| | Solid content (parts by mass) | | 0.45 | 0.45 | 0.45 | 0.45 | 0.45 | 0.45 | 0.45 | 0.45 | — | — |
| Sodium chloride | Amount (parts by mass) | | — | — | — | — | — | — | — | — | 3.3 | — |
| | Solid content (parts by mass) | | — | — | — | — | — | — | — | — | 0.66 | — |
| Sodium sulfate | Amount (parts by mass) | | — | — | — | — | — | — | — | — | — | 3.3 |
| | Solid content (parts by mass) | | — | — | — | — | — | — | — | — | — | 0.66 |
| Particles | Kind | | — | Cross-linked dimethyl polysiloxane | Polymethyl silsesquioxane | Polytetrafluoroethylene | Polyethylene | Polyethylene | Ethylene-bis-stearic acid amide | Calcium stearate | — | — |
| | Amount (parts by mass) | | — | 5.0 | 4.0 | 7.0 | 6.0 | 2.0 | 3.0 | 5.0 | — | — |
| | Average particle diameter (μm) | | — | Spherical 68 | Irregular 12 | Irregular 100 | Spherical 100 | Irregular 100 | Irregular 100 | Scale 60 | — | — |
| | Shape | | — | | | | | | | | | |
| | TG weight reduction ratio (%) | | — | | | | | | | | | |
| | Amount (parts by mass) | | — | 0.25 | 0.25 | 0.25 | 0.25 | 0.25 | 0.25 | 0.25 | — | — |
| | Contact angle (°) | | — | not measurable | 133 | 142 | 136 | 134 | 133 | 126 | — | — |
| Water content (% by mass) | | | 33 | 38 | 36 | 36 | 37 | 37 | 35 | 36 | | |
| Production method of casting mold | | | Addition of water | Addition of water | Addition of water | Addition of water | Addition of water | Addition of water | Addition of water | Addition of water | Addition of water 2 | Addition of water 3 |
| Sample (1 × 1 × 8 cm) | Filling rate (% by mass) | | 54.5 | 54.5 | 53.4 | 55.0 | 54.6 | 54.0 | 54.8 | 55.0 | 54.9 | 54.5 |
| Aluminum casting test | State of sand adhesion after casting process | | Poor | Average | Average | Average | Poor | Poor | Average | Average | Poor | Poor |
| | Surface roughness of cast product | | Poor | Poor | Poor | Poor | Poor | Poor | Poor | Poor | Poor | Poor |

As is apparent from the results shown in Table 1, the coated sands: CS1-CS10 used in the Examples 1-10 according to the invention exhibited high filling rates. Besides, in the aluminum casting tests, the coated sands according to the invention proved to enjoy excellent observation results with respect to the state of sand adhesion after casting process. The coated sands according to the invention were excellent also in the evaluation results of the surface roughness of the obtained cast products.

On the other hand, as is apparent from the results shown in Table 2, the filling rate of the sample was low in each of the Comparative Examples 1, 9 and 10 using the respective CS11, CS19 and CS20, in which the aggregate was mixed only with the water glass, sodium chloride and sodium sulfate respectively, as the water-soluble inorganic binder, without any particle being added to the aggregate. These CSs were inferior also with respect to the state of sand adhesion and the surface roughness of the obtained cast products in the aluminum casting tests. In the Comparative Example 2, the CS12 containing the spherical particles of silicone resin not having binder-repellency was used together with the water glass as the water-soluble inorganic binder, so that the filling rate was not sufficient, and the state of sand adhesion after casting process and the surface roughness were inferior in the aluminum casting test. Furthermore, the CS13-CS18 used in the Comparative Examples 3-8 contained the non-spherical resin particles and other resin particles, or organic resin particles, so that the filling rates were inferior, and also the evaluation results in the aluminum casting test were not good in these Comparative Examples.

Next, the same evaluations were conducted by using the following CSs in the dry state, and employing a method of passing steam in the metal die for supplying water to the coated sand in the dry state, in place of the method of addition of water as described above.

Production Case of CS21 in the Dry State

CS21 in the dry state was obtained by the same procedure as in the Production Case of CS1 in the dry state, except that a spherical artificial sand LUNAMOS #50 (Trade Name; available from Kao-Quaker Co., Ltd., JAPAN, AFS: 52.1) was used as the refractory aggregate. The water content of the CS21 was equivalent to 35% by mass of the solid content of the water glass.

Production Case of CS22 in the Dry State

CS22 in the dry state was obtained by the same procedure as in the Production Case of CS3 in the dry state, except that a spherical artificial sand LUNAMOS #50 (Trade Name; available from Kao-Quaker Co., Ltd., JAPAN) was used as the refractory aggregate. The water content of the CS22 was equivalent to 36% by mass of the solid content of the water glass.

Production Case of CS23 in the Dry State

CS23 in the dry state was obtained by the same procedure as in the Production Case of CS11 in the dry state, except that a spherical artificial sand LUNAMOS #50 (Trade Name; available from Kao-Quaker Co., Ltd., JAPAN) was used as the refractory aggregate. The water content of the CS23 was equivalent to 34% by mass of the solid content of the water glass.

Production Case of CS24 in the Dry State

CS24 in the dry state was obtained by the same procedure as in the Production Case of CS12 in the dry state, except that a spherical artificial sand LUNAMOS #50 (Trade Name; available from Kao-Quaker Co., Ltd., JAPAN) was used as the refractory aggregate. The water content of the CS24 was equivalent to 37% by mass of the solid content of the water glass.

Production Case of CS25 in the Dry State

CS25 in the dry state was obtained by the same procedure as in the Production Case of CS18 in the dry state, except that a spherical artificial sand LUNAMOS #50 (Trade Name; available from Kao-Quaker Co., Ltd., JAPAN) was used as the refractory aggregate. The water content of the CS25 was equivalent to 36% by mass of the solid content of the water glass.

Formation Case II of casting molds (Examples 11-12 and Comparative Examples 11-13)

Each of the CS21-CS25 (temperature: 20° C.) produced according to the above-mentioned procedure was blown into a metal die heated to 110° C., at a gauge pressure of 0.3 MPa, and was thus filled in the metal die. Then, a steam having a temperature of 99° C. was blown into the metal die at a gauge pressure of 0.05 MPa for 4 seconds, and passed through the filled phase of the coated sand (CS), to thereby moisturize the CS. Subsequently, after the passing of the steam had finished, a heated air having a temperature of 150° C. was blown into the metal die at a gauge pressure of 0.03 MPa for 2 minutes to thereby solidify or cure the CS filled in the metal die, whereby a casting mold used as a sample (dimensions: 2.54 cm×2.54 cm×20.0 cm) for measuring a filling rate was formed. The CSs which were used in the Examples 11-12 and the Comparative Examples 11-13 are shown in the following Table 3.

With respect to the formed sample, the filling rate of the CS constituting the sample was measured. The CS was also subjected to an aluminum casting test to thereby evaluate the state of sand adhesion after casting process and the surface roughness of the obtained casting, according to the above-mentioned methods. The results are shown in the following Table 3.

TABLE 3

| | | | Example 11 CS21 | Example 12 CS22 | Comparative Example 11 CS23 | Comparative Example 12 CS24 | Comparative Example 13 CS25 |
|---|---|---|---|---|---|---|---|
| Constitution of coated sand (CS) | Aggregate | Kind | LUNAMOS #50 | LUNAMOS #50 | LUNAMOS #50 | LUNAMOS #50 | LUNAMOS #50 |
| | | Amount (parts by mass) | 100 | 100 | 100 | 100 | 100 |
| | Water glass | Kind | No. 2 | No. 2 | No. 2 | No. 2 | No. 2 |
| | | Molar ratio | 2.5 | 2.5 | 2.5 | 2.5 | 2.5 |
| | | Amount (parts by mass) | 1.1 | 1.1 | 1.1 | 1.1 | 1.1 |
| | | Solid content (parts by mass) | 0.45 | 0.45 | 0.45 | 0.45 | 0.45 |
| | Particles | Kind | Polymethyl silsesquioxane | Polymethyl silsesquioxane | — | Cross-linked dimethyl polysiloxane | Calcium stearate |
| | | Average particle diameter (μm) | 2.0 | 2.0 | — | 5.0 | 5.0 |
| | | Shape | Spherical | Spherical | — | Spherical | Scale |
| | | TG weight reduction ratio (%) | 12 | 12 | — | 68 | 60 |
| | | Amount (parts by mass) | 0.05 | 0.25 | — | 0.25 | 0.25 |
| | | Contact angle (°) | 135 | 135 | — | Not measurable | 126 |
| | Water content (% by mass) | | 35 | 36 | 34 | 37 | 36 |
| Production method of casting mold | | | Passing of steam | Passing of steam | Passing of steam | Passing of steam | Passing of steam |
| Sample (2.54 × 2.54 × 20 cm) | Filling rate (% by mass) | | 57.6 | 58.4 | 51.4 | 54.5 | 52.0 |
| Aluminum casting test | State of sand adhesion after casting process | | Good | Good | Poor | Average | Average |
| | Surface roughness of cast product | | Good | Good | Poor | Poor | Poor |

As is apparent from the results shown in Table 3, also in the case of the method for manufacturing a casting mold including the process of passing steam, the samples enjoyed high filling rates in the Examples 11 and 12, in which the respective CSs 11 and 12 in the dry state according to the invention were used. The results of the aluminum casting tests with respect to the state of sand adhesion after casting process and the surface roughness of the cast product were also excellent in these Examples. On the other hand, the CSs used in in the Comparative Examples 11 to 13 were, respectively, the CS23 not containing the spherical particles of silicone resin having binder-repellency according to the invention, the CS24 containing the spherical particles of silicone resin not having binder-repellency, and the CS25 containing the particles of calcium stearate, which are different from the spherical particles of silicone resin. In the Comparative Examples 11 to 13, the samples suffered from low filling rates, and the state of sand adhesion after casting process and the surface roughness of the obtained cast products in the aluminum casting tests were also poor in these Comparative Examples.

Furthermore, the following CSs in the dry state additionally containing a moisture-resistance improving agent were provided, and a test for evaluating a strength retention ratio upon moisture absorption was conducted with respect to a casting mold obtained from each of the CSs.

Production Case of CS26 in the Dry State

CS26 in the dry state was obtained by the same procedure as in the Production Case of CS3 in the dry state, except that 0.05 part of sodium tetraborate decahydrate which is the moisture-resistance improving agent was further used. The water content of the CS26 was equivalent to 35% by mass of the solid content of the water glass.

Production Case of CS27 in the Dry State

CS27 in the dry state was obtained by the same procedure as in the Production Case of CS3 in the dry state, except that 0.05 part of lithium tetraborate which is the moisture-resistance improving agent was further used. The water content of the CS27 was equivalent to 35% by mass of the solid content of the water glass.

Production Case of CS28 in the Dry State

CS28 in the dry state was obtained by the same procedure as in the Production Case of CS3 in the dry state, except that 0.05 part of a basic zinc carbonate which is the moisture-resistance improving agent was further used. The water content of the CS28 was equivalent to 35% by mass of the solid content of the water glass.

Production Case of CS29 in the Dry State

CS29 in the dry state was obtained by the same procedure as in the Production Case of CS3 in the dry state, except that 0.05 part of ferrous carbonate which is the moisture-resistance improving agent was further used. The water content of the CS29 was equivalent to 35% by mass of the solid content of the water glass.

Production Case of CS30 in the Dry State

CS30 in the dry state was obtained by the same procedure as in the Production Case of CS3 in the dry state, except that 0.05 part of lithium carbonate which is the moisture-resistance improving agent was further used. The water content of the CS30 was equivalent to 35% by mass of the solid content of the water glass.

Production Case of CS31 in the Dry State

CS31 in the dry state was obtained by the same procedure as in the Production Case of CS11 in the dry state, except that 0.05 part of sodium tetraborate decahydrate which is the moisture-resistance improving agent was further used. The water content of the CS31 was equivalent to 34% by mass of the solid content of the water glass.

Production Case of CS32 in the Dry State

CS32 in the dry state was obtained by the same procedure as in the Production Case of CS11 in the dry state, except that 0.05 part of a basic zinc carbonate which is the moisture-resistance improving agent was further used. The water content of the CS32 was equivalent to 34% by mass of the solid content of the water glass.

Formation Case III of casting molds (Examples 3, 13-17 and Comparative Examples 1, 14-15

Each of the CS3, the CS11 and the CS26-CS32 produced according to the above-mentioned procedure was charged into a Shinagawa-type universal stirrer (5DM-r type; available from Dalton Corporation, JAPAN) at the room temperature (temperature: 20° C.), and subsequently water was introduced into the stirrer in an amount of 1.0 part per 100 parts of the CS. The contents in the stirrer were stirred, so that a moisturized CS (mold material) was obtained. Next, the moisturized CS taken out of the stirrer was filled in a metal die heated to 150° C., and was held within the metal die to be solidified or cured, whereby a casting mold used as a sample for measuring strength was formed. The CSs which were used in the Examples and the Comparative Examples are shown in the following Table 4.

The strength retention ratio upon moisture absorption was calculated according to the above-mentioned measuring method, on the basis of the flexural strength and the flexural strength after moisture absorption of each of the samples for measuring strength formed in the Examples and the Comparative Examples. The results are shown in the following Table 4.

TABLE 4

| | | | Example 3 CS3 | Example 13 CS26 | Example 14 CS27 | Example 15 CS28 | Example 16 CS29 |
|---|---|---|---|---|---|---|---|
| Constitution of coated sand (CS) | Aggregate | Kind | LUNAMOS #60 | LUNAMOS #60 | LUNAMOS #60 | LUNAMOS #60 | LUNAMOS #60 |
| | | Amount (parts by mass) | 100 | 100 | 100 | 100 | 100 |
| | Water glass | Kind | No. 2 | No. 2 | No. 2 | No. 2 | No. 2 |
| | | Molar ratio | 2.5 | 2.5 | 2.5 | 2.5 | 2.5 |
| | | Amount (parts by mass) | 1.1 | 1.1 | 1.1 | 1.1 | 1.1 |
| | | Solid content (parts by mass) | 0.45 | 0.45 | 0.45 | 0.45 | 0.45 |
| | Particles | Kind | Polymethyl silsesquioxane | Polymethyl silsesquioxane | Polymethyl silsesquioxane | Polymethyl silsesquioxane | Polymethyl silsesquioxane |
| | | Average particle diameter ($\mu$m) | 2.0 | 2.0 | 2.0 | 2.0 | 2.0 |
| | | Shape | Spherical | Spherical | Spherical | Spherical | Spherical |
| | | TG weight reduction ratio (%) | 12 | 12 | 12 | 12 | 12 |
| | | Amount (parts by mass) | 0.25 | 0.25 | 0.25 | 025 | 0.25 |
| | Moisture-resistance improving agent | Binder-repellency | Yes | Yes | Yes | Yes | Yes |
| | | Sodium tetraborate (parts by mass) | — | 0.05 | — | — | — |
| | | Lithium tetraborate (parts by mass) | — | — | 0.05 | — | — |
| | | Baste zinc carbonate (parts by mass) | — | — | — | 0.05 | — |
| | | Ferrous carbonate (parts by mass) | — | — | — | — | 005 |
| | | Lithium carbonate (parts by mass) | — | — | — | — | — |
| | Water content (% by mass) | | 34 | 35 | 35 | 35 | 35 |
| | Strength retention ratio upon moisture absorption (temperature: 40° C. × Humidity: 80%, after 24 hours) (%) | | 63 | 82 | 73 | 75 | 71 |

| | | | Example 17 CS30 | Comparative Example 1 CS11 | Comparative Example 14 CS31 | Comparative Example 15 CS32 |
|---|---|---|---|---|---|---|
| Constitution of coated sand | Aggregate | Kind | LUNAMOS #60 | LUNAMOS #60 | LUNAMOS #60 | LUNAMOS #60 |

TABLE 4-continued

| (CS) | | Amount (parts by mass) | 100 | 100 | 100 | 100 |
|---|---|---|---|---|---|---|
| | Water glass | Kind | No. 2 | No. 2 | No. 2 | No. 2 |
| | | Molar ratio | 2.5 | 2.5 | 2.5 | 2.5 |
| | | Amount (parts by mass) | 1.1 | 1.1 | 1.1 | 1.1 |
| | | Solid content (parts by mass) | 0.45 | 0.45 | 0.45 | 0.45 |
| | Particles | Kind | Polymethyl silsesquioxane | — | — | — |
| | | Average particle diameter (μm) | 2.0 | — | — | — |
| | | Shape | Spherical | — | — | — |
| | | TG weight reduction ratio (%) | 12 | — | — | — |
| | | Amount (parts by mass) | 0.25 | — | — | — |
| | Moisture-resistance improving agent | Binder-repellency | Yes | — | — | — |
| | | Sodium tetraborate (parts by mass) | — | — | 0.05 | — |
| | | Lithium tetraborate (parts by mass) | — | — | — | — |
| | | Baste zinc carbonate (parts by mass) | — | — | — | 0.05 |
| | | Ferrous carbonate (parts by mass) | — | — | — | — |
| | | Lithium carbonate (parts by mass) | 0.05 | — | — | — |
| Water content (% by mass) | | | 35 | 33 | 34 | 34 |
| Strength retention ratio upon moisture absorption (temperature: 40° C. × Humidity: 80%, after 24 hours) (%) | | | 69 | 28 | 66 | 56 |

As is apparent from the results shown in Table 4, the casting molds of the Examples 13-17 obtained by using the CS26-CS30 further containing the moisture-resistance improving agent such as borate and zinc carbonate according to the invention exhibited better properties with respect to the strength retention ratio upon moisture absorption, than that of the casting mold of the Example 3 obtained by using the CS3 not containing any moisture-resistance improving agent. In addition, it is recognized that the strength retention ratio upon moisture absorption was significantly higher in the casting molds of the Examples 13-17, than in the casting molds of the Comparative Examples 1, 14 and 15 obtained by using the respective CS11, CS31 and CS32 not containing the spherical particles of silicone resin having binder-repellency.

Furthermore, the flexural strength was measured with respect to each of the samples for measuring a filling rate used in the Example 1 and the Comparative Examples 7-8. The results are shown in the following Table 5.

TABLE 5

| | | | Example 1 CS1 | Comparative Example 7 CS17 | Comparative Example 8 CS18 |
|---|---|---|---|---|---|
| Constitution of coated sand (CS) | Aggregate | Kind | LUNAMOS #60 | LUNAMOS #60 | LUNAMOS #60 |
| | | Amount (parts by mass) | 100 | 100 | 100 |
| | Water glass | Kind | No. 2 | No. 2 | No. 2 |
| | | Molar ratio | 2.5 | 2.5 | 2.5 |
| | | Amount (parts by mass) | 1.1 | 1.1 | 1.1 |
| | | Solid content (parts by mass) | 0.45 | 0.45 | 0.45 |
| | Particles | Kind | Polymethyl silsesquioxane | Ethylene-bis-stearic acid amide | Calcium stearate |
| | | Average particle diameter (μm) | 2.0 | 3.0 | 5.0 |
| | | Shape | Spherical | Irregular | Scale |
| | | TG weight reduction ratio (%) | 12 | 100 | 60 |
| | | Amount (parts by mass) | 0.05 | 0.25 | 0.25 |
| | | Contact angle (°) | 135 | 133 | 126 |
| | | Water content (% by mass) | 34 | 35 | 36 |
| | Production method of casting mold | | Addition of water | Addition of water | Addition of water |
| Sample (1 × 1 × 8 cm) | Flexural strength (N/cm²) | | 749.2 | 362.0 | 391.0 |

As is apparent from the results shown in Table 5, the sample obtained in the Example 1 according to the invention enjoyed remarkably high flexural strength because the sample was formed of the CS1 containing the predetermined spherical particles of silicone resin. In contrast, the samples for measuring a filling rate of the Comparative Examples 7 and 8 obtained by using the CS17 and the CS18 containing ethylene-bis-stearic acid amide and calcium stearate as the particles respectively had significantly low flexural strength.

Subsequently, the amount of gas generation was measured according to the above-mentioned measuring method, with respect to each of the samples for measuring a filling rate used in the Examples 3, 5 and 6, and the Comparative Examples 4-8. The results are shown in the following Table 6.

TABLE 6

| | | | Example 3 CS3 | Example 5 CS5 | Example 6 CS6 | Comparative Example 4 CS14 |
|---|---|---|---|---|---|---|
| Constitution of coated sand (CS) | Aggregate | Kind | LUNAMOS #60 | LUNAMOS #60 | LUNAMOS #60 | LUNAMOS #60 |
| | | Amount (parts by mass) | 100 | 100 | 100 | 100 |
| | Water glass | Kind | No. 2 | No. 2 | No. 2 | No. 2 |
| | | Molar ratio | 2.5 | 2.5 | 2.5 | 2.5 |
| | | Amount (parts by mass) | 1.1 | 1.1 | 1.1 | 1.1 |
| | | Solid content (parts by mass) | 0.45 | 0.45 | 0.45 | 0.45 |
| | Particles | Kind | Polymethyl silsesquioxane | Polymethyl silsesquioxane | Polymethyl silsesquioxane | Polytetra fluoroethylene |
| | | Average particle diameter (μm) | 2.0 | 0.7 | 5.0 | 7.0 |
| | | Shape | Spherical | Spherical | Spherical | Irregular |
| | | TG weight reduction ratio (%) | 12 | 14 | 14 | 100 |
| | | Amount (parts by mass) | 025 | 0.25 | 0.25 | 0.25 |
| | | Contact angle (°) | 135 | 129 | 129 | 142 |
| Water content (% by mass) | | | 34 | 34 | 35 | 36 |
| Amount of gas generator (700° C., ml/g) | | | 2.3 | 2.3 | 2.3 | 2.8 |

| | | | Comparative Example 5 CS15 | Comparative Example 6 CS16 | Comparative Example 7 CS17 | Comparative Example 8 CS18 |
|---|---|---|---|---|---|---|
| Constitution of coated sand (CS) | Aggregate | Kind | LUNAMOS #60 | LUNAMOS #60 | LUNAMOS #60 | LUNAMOS #60 |
| | | Amount (parts by mass) | 100 | 100 | 100 | 100 |
| | Water glass | Kind | No . 2 | No. 2 | No. 2 | No. 2 |
| | | Molar ratio | 2.5 | 2.5 | 2.5 | 2.5 |
| | | Amount (parts by mass) | 1.1 | 1.1 | 1.1 | 1.1 |
| | | Solid content (parts by mass) | 0.45 | 0.45 | 0.45 | 0.45 |
| | Particles | Kind | Polyethylene | Polyethylene | Ethytene-bis-stearic acid amide | Calcium stearate |
| | | Average particle diameter (μm) | 6.0 | 2.0 | 3.0 | 5.0 |
| | | Shape | Spherical | Irregular | Irregular | Scale |
| | | TG weight reduction ratio (%) | 100 | 100 | 100 | 60 |
| | | Amount (parts by mass) | 0.25 | 0 25 | 0.25 | 0.25 |
| | | Contact angle (°) | 136 | 134 | 133 | 126 |
| Water content (% by mass) | | | 37 | 37 | 35 | 36 |
| Amount of gas generator (700° C., ml/g) | | | 4.2 | 4.2 | 4.3 | 3.3 |

As is apparent from the results shown in Table 6, the samples of the Examples 3, 5 and 6 obtained by using the CSs containing the spherical particles of silicone resin having binder-repellency according to the invention generated small amounts of gas. In contrast, the samples of the Comparative Examples 4-8, obtained by using the CSs containing the resin particles of the material outside the scope of the invention or the organic particles, generated large amounts of gas. Consequently, it is recognized that these Comparative Examples have an inherent problem that gas deficiency may be caused in a cast product to be obtained.

Furthermore, tests were conducted for examining the change of physical properties in the case where CSs were obtained by using flattery silica sand as the refractory aggregate in place of the artificial sand.

Production Case of CS33 in the Dry State

CS33 in the dry state having a water content of 35% was obtained by the same procedure as in the Production Case of CS1 in the dry state, except that flattery silica sand consisting of irregular particles was used as the refractory aggregate in place of the LUNAMOS #60, the water glass was used in an amount of 2.06 parts (solid content: 0.85 part) per 100 parts of the aggregate (flattery silica sand), and further the spherical particles of silicone resin were used in an amount of 0.25 part.

Production Case of CS34 in the Dry State

CS34 in the dry state having a water content of 36% was obtained by the same procedure as in the Production Case of CS33 in the dry state, except that the spherical particles of silicone resin were used in an amount of 0.5 part.

Production Case of CS35 in the Dry State

CS35 in the dry state having a water content of 35% was obtained by the same procedure as in the Production Case of CS33 in the dry state, except that sodium silicate No. 1 (molar ratio $SiO_2/Na_2O$: 2.1; solid content: 48.5%) was used as the water glass, in an amount of 1.75 parts (solid content: 0.85 part) per 100 parts of the flattery silica sand.

Production Case of CS36 in the Dry State

CS36 in the dry state having a water content of 35% was obtained by the same procedure as in the Production Case of CS33 in the dry state, except that sodium silicate No. 3 (molar ratio $SiO_2/Na_2O$: 3.2; solid content: 38%) was used as the water glass, in an amount of 2.24 parts (solid content: 0.85 part) per 100 parts of the flattery silica sand.

Production Case of CS37 in the Dry State

CS37 in the dry state having a water content of 34% was obtained by the same procedure as in the Production Case of CS33 in the dry state, except that the spherical particles of silicone resin were not used.

Production Case IV of casting molds (Examples 18-21 and Comparative Example 16)

Each of the CS33-CS37 produced according to the above-mentioned procedure was charged into a Shinagawa-type universal stirrer (5DM-r type; available from Dalton Corporation, JAPAN) at the room temperature (temperature: 20° C.), and subsequently water was added to the stirrer in an amount of 1.0 part per 100 parts of the CS. The contents in the stirrer were stirred, so that a moisturized CS was obtained. Next, the moisturized CS taken out of the stirrer was blown into a metal die heated to 150° C., at a gauge pressure of 0.3 MPa, and was thus filled in the metal die. The CS filled in the metal die was held within the metal die to be solidified or cured, whereby a sample (dimensions: 1.0 cm×1.0 cm×8.0 cm) for measuring a filling rate was formed. The CSs which were used in the Examples 18-21 and the Comparative Example 16 are shown in the following Table 7.

The formed sample was measured or evaluated with respect to its filling rate, the state of sand adhesion after casting process and the surface roughness of a cast product obtained therefrom, according to the above-mentioned methods. The results are shown in Table 7.

TABLE 7

| | | | Example 18 CS33 | Example 19 CS34 | Example 20 CS35 | Example 21 CS36 | Comparative Example 16 CS37 |
|---|---|---|---|---|---|---|---|
| Constitution of coated sand (CS) | Aggregate | Kind | Flattery silica sand | Flattery silica sand | Flattery silica sand | Flattery silica sand | Flattery silica sand |
| | | Amount (parts by mass) | 100 | 100 | 100 | 100 | 100 |
| | Water glass | Kind | No. 2 | No. 2 | No. 1 | No. 3 | No. 2 |
| | | Molar ratio | 2.5 | 2.5 | 2.1 | 3.2 | 2.5 |
| | | Amount (parts by mass) | 2.06 | 2.06 | 1.75 | 2.24 | 2.06 |
| | | Solid content (parts by mass) | 0.85 | 0.85 | 0.85 | 0.85 | 0.85 |
| | Particles | Kind | Polymethyl silsesquioxane | Polymethyl silsesquioxane | Polymethyl silsesquioxane | Polymethyl silsesquioxane | — |
| | | Average particle diameter (μm) | 2.0 | 2.0 | 2.0 | 2.0 | — |
| | | Shape | Spherical | Spherical | Spherical | Spherical | — |
| | | TG weight reduction ratio (%) | 12 | 12 | 12 | 12 | — |
| | | Amount (parts by mass) | 0.25 | 0.50 | 0.25 | 0.25 | — |
| | | Contact angle (°) | 135 | 135 | 135 | 135 | — |
| | Water content (% by mass) | | 35 | 36 | 35 | 35 | 34 |
| Production method of casting mold | | | Addition of water | Addition of water | Addition of water | Addition of water | Addition of water |
| Sample (1 × 1 × 8 cm) | Filling rate (% by mass) | | 59.2 | 60.1 | 58.3 | 58.1 | 53.8 |

TABLE 7-continued

|  |  | Example 18 CS33 | Example 19 CS34 | Example 20 CS35 | Example 21 CS36 | Comparative Example 16 CS37 |
|---|---|---|---|---|---|---|
| Aluminum casting test | State of sand adhesion after casting process | Good | Good | Good | Good | Poor |
|  | Surface roughness of cast product | Average | Good | Average | Average | Poor |

As is apparent from the results shown in Table 7, the effects of the invention were achieved also in the case where the flattery silica sand was used in place of the artificial aggregate as the refractory aggregate. Meanwhile, in the Examples 18, 20 and 21, the water glass Nos. 1 to 3 were used. The flexural strength was 419.7 N/cm$^2$ in the Example 18, 429.6 N/cm$^2$ in the Example 20 and 344.4 N/cm$^2$ in the Example 21. Thus, it is recognized that the water glass Nos. 1 and 2 are more desirable in terms of the strength of the casting mold.

NOMENCLATURE OF REFERENCE SIGNS

| 12 | Molten metal inlet | 14 | Baseboard fixing portion |
| 16 | Main mold | 18 | Baseboard |
| 20 | Core | 22 | Sand mold |
| 24 | Waste core sand discharge port | | |
| 26 | Cast product | | |

The invention claimed is:

1. A coated sand, wherein a surface of a refractory aggregate is coated with a binder layer in the solid state formed by using a water-soluble inorganic binder, and
   wherein spherical particles of silicone resin having binder-repellency exist on a surface of the binder layer, or form a layer on the surface of the binder layer, a part of the spherical particles being not covered with the water-soluble inorganic binder and being exposed,
   whereby the coated sand is constituted as a dry granular material having fluidity at room temperature.

2. The coated sand according to claim 1, wherein an average particle diameter of the spherical particles is within a range of 0.01 μm-50 μm.

3. The coated sand according to claim 1, wherein a content of the spherical particles is within a range of 0.1-500 parts by mass per 100 parts by mass of a solid content of the water-soluble inorganic binder in the coated sand.

4. The coated sand according to claim 1, wherein the spherical particles are resin particles whose main component is organopolysiloxane.

5. The coated sand according to claim 4, wherein the organopolysiloxane is silsesquioxane.

6. The coated sand according to claim 5, wherein the silsesquioxane is polymethylsilsesquioxane.

7. The coated sand according to claim 1, wherein the spherical particles have binder-repellency characterized in that, when the water-soluble inorganic binder in the liquid state used for forming the binder layer is dripped on a horizontal plane formed of the spherical particles, a contact angle between the water-soluble inorganic binder and the horizontal plane is not less than 90°.

8. The coated sand according to claim 1, wherein the spherical particles have a weight reduction ratio within a range of 5-50%, when the spherical particles are subjected to heating in a thermogravimetric/differential thermal analyzer from room temperature to 700° C. in an air atmosphere.

9. The coated sand according to claim 1, further comprising a moisture-resistance improving agent.

10. The coated sand according to claim 1, wherein the water-soluble inorganic binder contains a water glass as its main component.

11. A method of manufacturing a casting mold, wherein the coated sand according to claim 1 is filled in a forming mold, subjected to passing of steam, and held within the forming mold so as to be solidified or cured, whereby the desired casting mold is obtained.

12. A method of manufacturing a casting mold, wherein
   water is added to the coated sand according to claim 1, to obtain a moisturized coated sand,
   the moisturized coated sand is filled in a forming mold, and
   the moisturized coated sand is held within the forming mold to be solidified or cured,
   whereby the desired casting mold is obtained.

13. A method of producing a coated sand, wherein a water-soluble inorganic binder in the liquid state and spherical particles of silicone resin having binder-repellency are kneaded or mixed with a heated refractory aggregate to form a mixture, and water in the obtained mixture is evaporated,
   so that the water-soluble inorganic binder forms a binder layer in the solid state on a surface of the refractory aggregate, while the spherical particles exist on a surface of the binder layer, or form a layer on the surface of the binder layer, a part of the spherical particles being not covered with the water-soluble inorganic binder and being exposed,
   whereby the coated sand is constituted as a dry granular material having fluidity at room temperature.

14. The method of producing a coated sand according to claim 13, wherein the spherical particles have binder-repellency characterized in that, when the water-soluble inorganic binder in the liquid state is dripped on a horizontal plane formed of the spherical particles, a contact angle between the water-soluble inorganic binder and the horizontal plane is not less than 90°.

15. The method of producing a coated sand according to claim 13, wherein the water-soluble inorganic binder in the liquid state is formed by separately adding a predetermined water-soluble inorganic binder and a predetermined amount of water at the time of preparation of the mixture.

16. A method of producing a coated sand, wherein a water-soluble inorganic binder in the liquid state is added to and kneaded or mixed with a heated refractory aggregate,
   spherical particles of silicone resin having binder-repellency are further, with a time lag, added to and kneaded or mixed with the refractory aggregate including the binder to form a mixture, and water in the obtained mixture is evaporated, so that the water-soluble inorganic binder forms a binder layer in the solid state on a surface of the refractory aggregate, while the spherical particles exist on a surface of the binder layer, or form a layer on the surface of the binder layer, a part of the spherical particles being not covered with the water-soluble inorganic binder and being exposed, whereby the coated sand is constituted as a dry granular material having fluidity at room temperature.

17. The method of producing a coated sand according to claim 16, wherein the spherical particles have binder-repellency characterized in that, when the water-soluble inorganic binder in the liquid state is dripped on a horizontal plane formed of the spherical particles, a contact angle between the water-soluble inorganic binder and the horizontal plane is not less than 90°.

18. The method of producing a coated sand according to claim 16, wherein the water-soluble inorganic binder in the liquid state is formed by separately adding a predetermined water-soluble inorganic binder and a predetermined amount of water at the time of preparation of the mixture.

* * * * *